US012611816B2

(12) United States Patent
Elsey

(10) Patent No.: US 12,611,816 B2
(45) Date of Patent: Apr. 28, 2026

(54) APPARATUS FOR MAKING A STEREOLITHOGRAPHIC OBJECT, METHODS FOR MAKING A STEREOLITHOGRAPHIC OBJECT, A METHOD FOR LOCATING THE POSITION OF DEBRIS, AND A METHOD FOR MONITORING CONSUMPTION OF A MATERIAL FOR MAKING A STEREOLITHOGRAPHIC OBJECT

(71) Applicant: Zydex Pty Ltd, Alexandria (AU)

(72) Inventor: Justin Elsey, Alexandria (AU)

(73) Assignee: Zydex Pty Ltd, Alexandria (AU)

( * ) Notice: Subject to any disclaimer, the term of this patent is extended or adjusted under 35 U.S.C. 154(b) by 100 days.

(21) Appl. No.: 18/434,410

(22) Filed: Feb. 6, 2024

(65) Prior Publication Data

US 2024/0173912 A1 May 30, 2024

Related U.S. Application Data

(63) Continuation of application No. 17/946,313, filed on Sep. 16, 2022, now Pat. No. 11,964,424, which is a
(Continued)

(30) Foreign Application Priority Data

Mar. 21, 2017 (AU) ................................ 2017900994

(51) Int. Cl.
*B29C 64/124* (2017.01)
*B29C 64/232* (2017.01)
(Continued)

(52) U.S. Cl.
CPC .......... *B29C 64/124* (2017.08); *B29C 64/232* (2017.08); *B29C 64/245* (2017.08);
(Continued)

(58) Field of Classification Search
CPC ... B29C 64/124; B29C 64/129; B29C 64/135; B29C 64/393
See application file for complete search history.

(56) References Cited

U.S. PATENT DOCUMENTS

| | | | |
|---|---|---|---|
| 2009/0289384 A1* | 11/2009 | Maalderink | ........... B29C 64/135 425/135 |
| 2017/0368747 A1* | 12/2017 | Nolet | .................... G01L 5/0076 |
| 2019/0217546 A1* | 7/2019 | Bosveld | ................ B29C 64/227 |

FOREIGN PATENT DOCUMENTS

| | | | | |
|---|---|---|---|---|
| CN | 106273513 A | * | 1/2017 | ............. B33Y 10/00 |

OTHER PUBLICATIONS

Huang et al. ("On-line force monitoring of platform ascending rapid prototyping system" J. Materials Processing Technology 159 (2005) 257-264) (Year: 2005).*
(Continued)

*Primary Examiner* — Ariella Machness
(74) *Attorney, Agent, or Firm* — Christensen, Fonder, Dardi & Herbert PLLC; John P. Fonder

(57) ABSTRACT

Disclosed herein is an apparatus for making a stereolithographic object. Also disclosed herein are methods for making a stereolithographic object, a method for locating the position of debris, a method for characterizing the viscosity of the material, and a method for monitoring consumption of a material for making a stereolithographic object.

8 Claims, 18 Drawing Sheets

Related U.S. Application Data continuation of application No. 16/495,405, filed as application No. PCT/AU2018/050253 on Mar. 20, 2018, now Pat. No. 11,465,338.

(51) Int. Cl.

| | |
|---|---|
| *B29C 64/245* | (2017.01) |
| *B29C 64/264* | (2017.01) |
| *B29C 64/393* | (2017.01) |
| *B33Y 10/00* | (2015.01) |
| *B33Y 30/00* | (2015.01) |
| *B33Y 40/00* | (2020.01) |
| *B33Y 50/02* | (2015.01) |

(52) U.S. Cl.
CPC .......... *B29C 64/264* (2017.08); *B29C 64/393* (2017.08); *B33Y 10/00* (2014.12); *B33Y 30/00* (2014.12); *B33Y 40/00* (2014.12); *B33Y 50/02* (2014.12)

(56) References Cited

OTHER PUBLICATIONS

Machine translation of CN106273513A (Year: 2017).*
Pan et al. ("Study of separation force in constrained surface projection stereolithography", Rapid Prototyping Journal, vol. 23 Issue: 2, pp. 353-361) (Year: 2017).*

* cited by examiner

APPARATUS FOR MAKING A STEREOLITHOGRAPHIC OBJECT, METHODS FOR MAKING A STEREOLITHOGRAPHIC OBJECT, A METHOD FOR LOCATING THE POSITION OF DEBRIS, AND A METHOD FOR MONITORING CONSUMPTION OF A MATERIAL FOR MAKING A STEREOLITHOGRAPHIC OBJECT

CROSS-REFERENCE TO RELATED APPLICATIONS

This application is a continuation U.S. patent application Ser. No. 17/946,313, filed Sep. 16, 2022, which claims priority to U.S. patent application Ser. No. 16/495,405, filed Sep. 19, 2019, which is a 371 U.S. National Phase Entry of International Patent Application No. PCT/AU2018/050253, filed Mar. 20, 2018, which claims priority to and benefit of Australian Patent Application No. 2017900994, filed Mar. 21, 2017, each of which is hereby incorporated by reference in its entirety.

TECHNICAL FIELD

The disclosure herein generally relates stereolithography, and particularly but not exclusively to apparatus for making a stereolithographic object, methods for making a stereolithographic object, a method for locating the position of debris, and a method for monitoring consumption of a material for making a stereolithographic object.

BACKGROUND

An object can be made one section at a time, that is layerwise, using an apparatus for making an object using a stereolithographic method. In a step of the stereolithographic method, a layer of a material used for making the object may be solidified in the shape of a section of the object. The step may be repeated until each of a plurality of sections constituting the object are made.

The position of the object being made by an apparatus, however, may not be at a target position because apparatus generated forces deform the apparatus. This may result in inconsistent layer thickness. Compensation for the deformation may result is more time than desired being taken to form a layer of the material of the correct thickness for solidification.

The material may be consumed before the object is completed, in which case the portion of the object fabricated may need to be discarded, the material replenished, and the portion of the object fabricated a second time.

Debris may interfere with fabrication of the object and may damage the apparatus. The debris may be one of, for example:

- be hardened material resulting from detachment of a partially formed object
- material for making the object that been unintentionally hardened
- foreign matter.

The unintentional hardening may be due to stray material solidifying radiation generated by the apparatus or otherwise, which is common and problematic.

It may be desirable to have improved apparatus for making an object.

SUMMARY

Disclosed herein is an apparatus for making a stereolithographic object. The apparatus comprises a platform for making the stereolithographic object thereon and a material receiving surface, wherein in use a material for making the stereolithographic object is disposed therebetween. The apparatus comprises a positioner operationally coupled to at least one of the platform and the material receiving surface, and operable to change the distance between the platform and the material receiving surface. The apparatus comprises a force sensing system configured to generate force information indicative of a force transmitted between the platform and the material receiving surface. The apparatus comprises a control system arranged to generate distance information indicative of the distance between the platform and the material receiving surface using the force information.

In an embodiment, the control system is configured to control the positioner using the distance information. The control system may be configured to control the positioner to reduce the distance between the platform and the material receiving surface using the distance information.

In an embodiment, the force comprises a material displacement force generated by the positioner for displacing a portion of the material when so disposed to reduce the distance between the platform and the material receiving surface.

In an embodiment, the control system is configured to generate the distance information by correcting for a distance information error caused by deformation resulting from the force.

An embodiment comprises at least one member operationally coupled to the platform, the distance information error being caused by deformation of at least one member by the force.

In an embodiment, the at least one member comprises a mechanical linkage between the platform and the material receiving surface.

An embodiment comprises memory in which is stored distance error correction information, which is used by the control system to correct the distance information error.

In an embodiment, the control system is configured to execute a method for generating the distance error correction information.

In an embodiment, the control system is configured to execute a method for empirically generating the distance error correction information. The method may comprise the steps of: engaging the platform with a stop; and generating force information indicative of a force transmitted between the platform and the stop for each of a plurality of positioner positions. The force sensing system may be used to generate the force information indicative of the force transmitted between the platform and the stop.

An embodiment comprises a limb attaching the platform to the positioner, wherein at least part of the force is transmitted via the limb to the force sensing system.

In an embodiment, the force sensing system is operationally coupled to the limb.

An embodiment comprises a structure supporting the material receiving surface, wherein the force sensing system is operationally coupled to the structure.

In an embodiment, the force sensing system engages the structure to a chassis.

In an embodiment, at least part of the force is transmitted via the structure to the force sensing system.

In an embodiment, the structure comprises a window. The apparatus may comprise a material solidifying radiation source configured to illuminate the material when so disposed with a material solidifying radiation through the window.

In an embodiment, the control system is configured to operate the positioner so that the distance information satisfies a distance condition.

In an embodiment, the distance condition comprises that the distance between the platform and the material receiving surface indicated by the distance information is within a predefined distance range. Alternatively, the distance condition comprises that the distance between the platform and the material receiving surface indicated by the distance information is a predefined distance.

In an embodiment, the control system is configured to use the force information to control the magnitude of the force. The control system may be configured to receive area information indicative of an area of at least one section of the stereolithographic object and control the magnitude of the force using the area information. The control system may be configured to give non-zero weightings to each of a plurality of areas of a plurality of sections of the stereolithographic object when controlling the magnitude of the force using the area information. The non-zero weightings may be determined using viscosity information indicative of the viscosity of the material. The viscosity information indicative of the viscosity of the material may comprise a viscosity distance.

In an embodiment, the force sensing system comprises a plurality of force sensing elements that are spaced apart. The plurality of force sensing elements may be spaced apart in at least one direction that is orthogonal to a normal to the material receiving surface. The plurality of force sensing elements may be spaced apart in two directions that are each orthogonal to a normal to the material receiving surface. The force information may be indicative of a portion of the force sensed by each of the plurality of force sensing elements. The control system may be configured to use the force information to determine a position on the material receiving surface that the force is applied to.

An embodiment comprises a flexible element comprising the material receiving surface.

In an embodiment, the flexible element forms at least part of a vessel configured to contain the material.

In an embodiment, the material for making the stereolithographic object comprises a liquid.

In an embodiment, the liquid is a sheet of liquid.

In an embodiment, the control system is configured to operate the material solidifying radiation source to a portion of the stereographic material when so disposed to form a stereolithographic section of the stereolithographic object.

An embodiment comprises a material solidifying radiation manipulator configured to manipulate radiation generated by the solidifying material radiation source.

In an embodiment, the material solidifying radiation manipulator is configured to impart a spatial feature to the material solidifying radiation.

In an embodiment, the radiation manipulator imparts a temporal feature to the material solidifying radiation.

In an embodiment, the control system is configured to control the positioner to increase the distance of the platform and the material receiving surface after operating the solidifying material radiation source.

In an embodiment, the material receiving surface is upwardly facing.

An embodiment is configured such that the material receiving surface is horizontally orientated.

In an embodiment, the control system is configured to receive instructions for making the stereolithographic object.

In an embodiment, the instructions may comprise data indicative of a plurality of sections to be sequentially formed.

In an embodiment, the control system is configured to move the positioner to a position such that the force is greater than when the control system moves the positioner to a position for making a section of the stereolithographic object.

In an embodiment, the control system is configured to execute steps of a method for displacing the material between the material receiving surface and the platform, the method comprising the steps of:

operating the positioner to move the stereolithographic object being made towards the material receiving surface;

operating the positioner to increase the deformation of the at least one member until the magnitude of the force indicated by the force information is at least one of equal to and greater than a maximum force magnitude value; and determining whether the distance information satisfies the distance condition, and if so satisfied stop the positioner.

In an embodiment, if the distance condition is so satisfied, the positioner is stopped at a position wherein the at least one member is not deformed.

Disclosed herein is an apparatus for making a stereolithographic object. The apparatus comprises a platform for making the stereolithographic object thereon and a material receiving surface for disposing thereon a material for making the stereolithographic object. The apparatus comprises a positioner operationally coupled to at least one of the platform and the material receiving surface, and operable to reduce the distance between the platform and the material receiving surface. The apparatus comprises a force sensing system comprising a plurality of force sensing elements that are configured to generate force information indicative of a portion of a force sensed by each of the plurality of force sensing elements and transmitted between the platform and the material receiving surface by debris therebetween. The apparatus comprises a processor configured to use the force information to determine the position of the debris.

In an embodiment, the plurality of force sensing elements are spaced apart. The plurality of force sensing elements may be spaced apart in at least one direction that is orthogonal to a normal to the material receiving surface. The force sensing system may comprise a plurality of force sensing elements that are spaced apart in two directions that are each orthogonal to a normal to the material receiving surface.

Disclosed herein is an apparatus for making a stereolithographic object. The apparatus comprises a platform for making the stereolithographic object thereon and a vessel for disposing therein a material for making the stereolithographic object. The apparatus comprises a force sensing system configured to generate force information indicative of the weight of the material when so disposed. The apparatus comprises a processor that determines when the force information satisfies a material weight condition and if so generates a material weight condition signal.

In an embodiment, the force sensing system supports the vessel.

In an embodiment, the material weight condition is that the weight of the material indicated by the force information is one of equal to and less than a predefined material weight value.

Disclosed herein is a method for making a stereolithographic object. The method comprises the step of disposing a material for making the object between a platform for making the object thereon and a material receiving surface. The method comprises the step of changing the distance between the platform and the material receiving surface. The method comprises the step of generating force information indicative of a force transmitted between the platform and the material receiving surface. The method comprises the step of generating distance information indicative of the distance between the platform and the material receiving surface using the force information.

An embodiment comprises controlling a change in the distance between the platform and the material receiving surface using the force information.

An embodiment comprises controlling a reduction in the distance between the platform and the material receiving surface using the force information.

In an embodiment, the force comprises a material displacement force for displacing a portion of the material and so reduce the distance between the platform and the material receiving surface.

In an embodiment, generating the distance information comprises correcting for a distance information error caused by deformation resulting from the force. The deformation may comprise deformation of a mechanical linkage between the platform and the material receiving surface.

An embodiment comprises using distance error correction information to correct the distance information error.

An embodiment comprises generating the distance error correction information.

Generating the distance error correction information may comprise empirically generating the distance error correction information. Empirically generating the distance error correction information may comprise:

engaging the platform with a stop; and generating force information indicative of a force transmitted between the platform and the stop for each of a plurality of positioner positions.

An embodiment comprises illuminating the material with a material solidifying radiation.

An embodiment comprises changing the distance between the platform and the material receiving surface so that the distance information satisfies a distance condition. The distance condition may be that the distance between the platform and the material receiving surface indicated by the distance information is within a predefined distance range. The distance condition may alternatively comprise that the distance between the platform and the material receiving surface indicated by the distance information is a predefined distance.

An embodiment comprises controlling the magnitude of the force using the force information.

An embodiment comprises controlling the magnitude of the force using area information indicative of an area of at least one section of the stereolithographic object.

An embodiment comprises giving non-zero weightings to each of a plurality of areas of a plurality of sections of the stereolithographic object when controlling the magnitude of the force using the area information. The non-zero weightings may be determined using viscosity information indicative of the viscosity of the material. The viscosity information indicative of the viscosity of the material may comprise a viscosity distance.

An embodiment comprises using force information indicative of a portion of the force sensed by each of a plurality of spaced apart force sensing elements to determine a position on the material receiving surface that force is applied to.

Disclosed herein is a method for locating the position of debris. The method comprises disposing a material for making the stereolithographic object on a material receiving surface adjacent a platform for making the stereolithographic object thereon. The method comprises reducing the distance between the platform and the material receiving surface such that the debris contacts the material receiving surface and the platform. The method comprises generating force information indicative of a portion of a force sensed by each of a plurality of force sensing elements that are spaced apart and transmitted between the platform and the material receiving surface by the debris. The method comprises determining the position of the debris using the force information.

In an embodiment, the plurality of force sensing elements are spaced apart.

In an embodiment, the plurality of force sensing elements are spaced apart in at least one direction that is orthogonal to a normal to the material receiving surface.

In an embodiment, the plurality of force sensing elements that are spaced apart in two directions that are each orthogonal to a normal to the material receiving surface.

Disclosed herein is a method for monitoring consumption of a material for making a stereolithographic object. The method comprises disposing a material for making a stereolithographic object in a vessel adjacent a platform for making a stereolithographic object thereon. The method comprises making the stereolithographic object on the platform and in doing so consuming the material disposed in the vessel. The method comprises generating force information indicative of the weight of the material in the vessel. The method comprises determining whether the force information satisfies a material weight condition and if so satisfied generate a material weight condition signal.

An embodiment comprises the steps of:

operating the positioner to move the stereolithographic object being made towards the material receiving surface;

operating the positioner to increase the deformation of the mechanical linkage until the magnitude of the force indicated by the force information is at least one of equal to and greater than a maximum force magnitude value; and determining whether the distance information satisfies the distance condition, and if so satisfied stop the positioner.

In an embodiment, if the distance condition is so satisfied, the positioner is stopped at a position wherein the at least one member is not deformed.

Disclosed herein is non-transitory processor readable tangible media including program instructions which when executed by a processor causes the processor to perform a method disclosed above.

Disclosed herein is a computer program for instructing a processor, which when executed by the processor causes the processor to perform a method disclosed above.

Any of the various features of each of the above disclosures, and of the various features of the embodiments described below, can be combined as suitable and desired.

BRIEF DESCRIPTION OF THE FIGURES

Embodiments will now be described by way of example only with reference to the accompanying figures in which.

DESCRIPTION OF EMBODIMENTS

Figure 1:
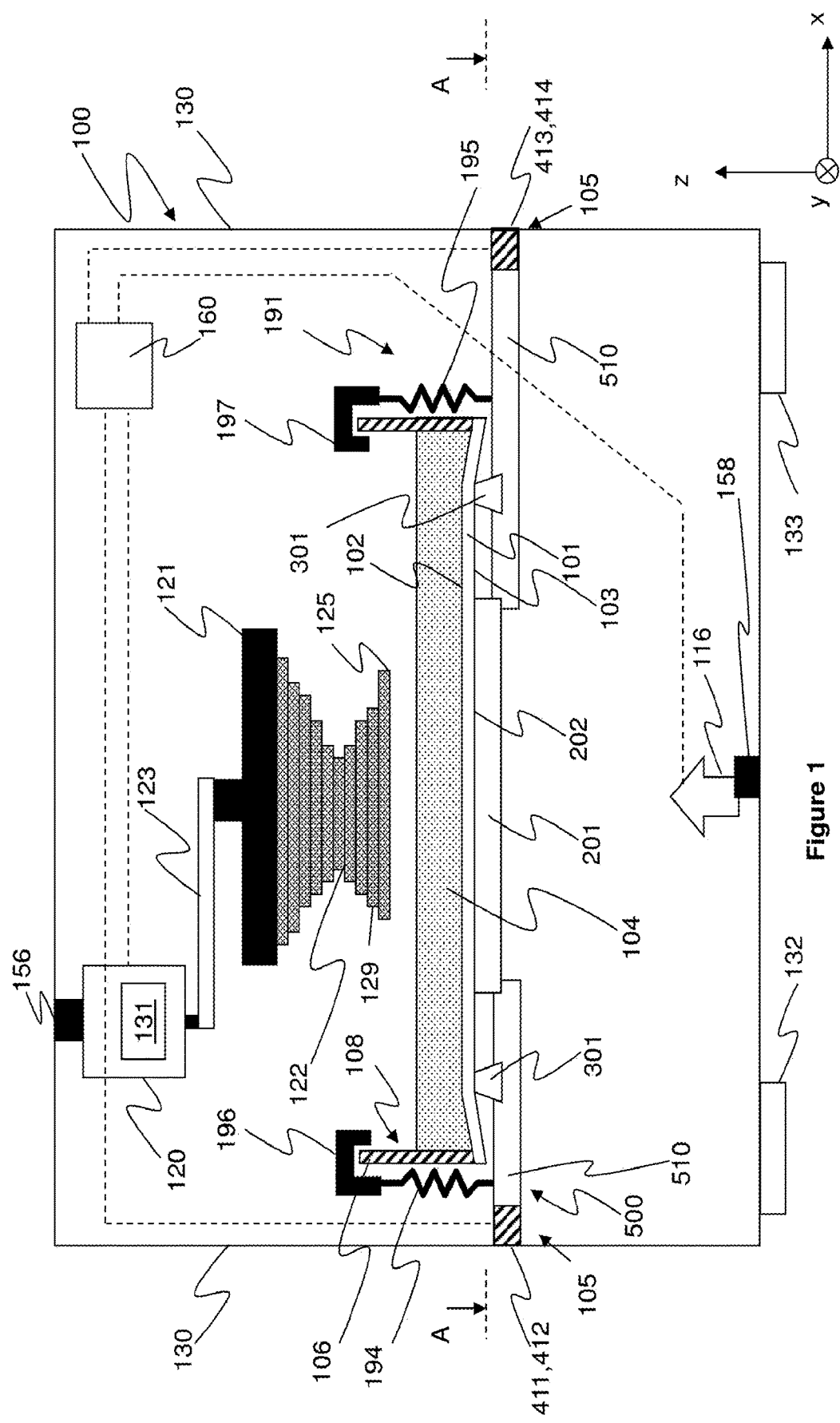
FIGS. 1 to 7 show schematic side elevation views of one embodiment of an apparatus for making a stereolithographic object.

FIGS. 1 to 7 show schematic views of one embodiment of an apparatus for making a stereolithographic object, the apparatus being generally indicated by the numeral 100. In the context of this document, a stereolithographic object is an object that has been made using a stereolithographic process. Coordinate axes are shown in the figures where x and y are horizontally orientated and z is vertically orientated.

The apparatus 100 comprises a platform 121 for making the stereolithographic object thereon. The apparatus 100 has a material receiving surface 102. In use, a material 104 for making the stereolithographic object is disposed between the material receiving surface 102 and the platform 121. The apparatus 100 has a positioner 120 operably coupled to at least one of the platform 121 and the material receiving surface 102. The positioner 120 is operable to change the distance between the platform 121 and the material receiving surface 102. The apparatus 100 comprises a force sensing system 105 configured to generate force information indicative of a force transmitted between the platform 121 and the material receiving surface 102. The apparatus 100 comprises a control system 160. In this but not all embodiments, the control system 100 is arranged to generate distance information indicative of the distance between the platform 121 and the material receiving surface 102 using the force information.

Further features of this embodiment will now be disclosed. Other embodiments may have any combination of the further features disclosed, or none of the further features disclosed. The control system 160 is configured to control the positioner 120 using the distance information. The positioner 120 can be so controlled to reduce the distance between the platform 121 and the material receiving surface 102. The positioner 120 can also be generally so controlled to increase the distance between the platform 121 and the material receiving surface 102. The positioner 120 is configured for linear motion along the plus and minus z-directions and is attached to a limb in the form of a bracket 123. The positioner 120 moves the platform 121 in the form of an inverted platform on which the stereolithographic object 122 being made is mounted. Alternatively, the positioner 120 may be arranged to move the material receiving surface 102 or both the material receiving surface 102 and the platform 121. During fabrication, the stereolithographic object being made 122 is attached to the platform 121. The positioner 120 positions the platform 121 and consequently the object being made 122 relative to the material receiving surface 102, which is in this but not all embodiments an upwardly facing surface.

The positioner 120 is controlled by the control system 160 to reduce the distance between the platform 121 and the material receiving surface 102. The control system 160 uses the distance information to control the positioner 120. The control system 160 is configured to receive instructions for making the stereolithographic object in the form of data indicative of a plurality of sections (e.g. 124, 125, 129) to be formed sequentially by the apparatus 100. Each individually determined section may differ from another of the sections by, for example, the shape of their respective boundaries. Not every section needs to be different, however. The control system 160 is configured to coordinate operation of the positioner 120, a material solidifying radiation source 116, and in some embodiments other parts, such that the plurality of sections are sequentially formed in accordance with the received instructions. The control system 160 comprises a processor.

In the context of this specification, a section is to be understood to encompass a slice of the stereolithographic object. A planar section encompasses a portion of the stereolithographic object located between two parallel planes that intersect the stereolithographic object. Generally, but not necessarily, the sections formed are planar sections.

The control system 160 is configured to operate the positioner 120 so that the distance information satisfies a distance condition. The distance condition comprises, in one mode of operation, that the distance between the platform 121 and the material receiving surface 102 indicated by the distance information is within a predefined distance range. The predefined range may correspond to a distance between the stereolithographic object being made 122 and the material receiving surface 102, being the thickness of one section of the object being made 122, to within a tolerance of, for example ±5%. Alternatively, for example, the distance condition comprises that the distance of the platform 121 and the material receiving surface 102 indicated by the distance information is a predefined distance.

Figure 2:
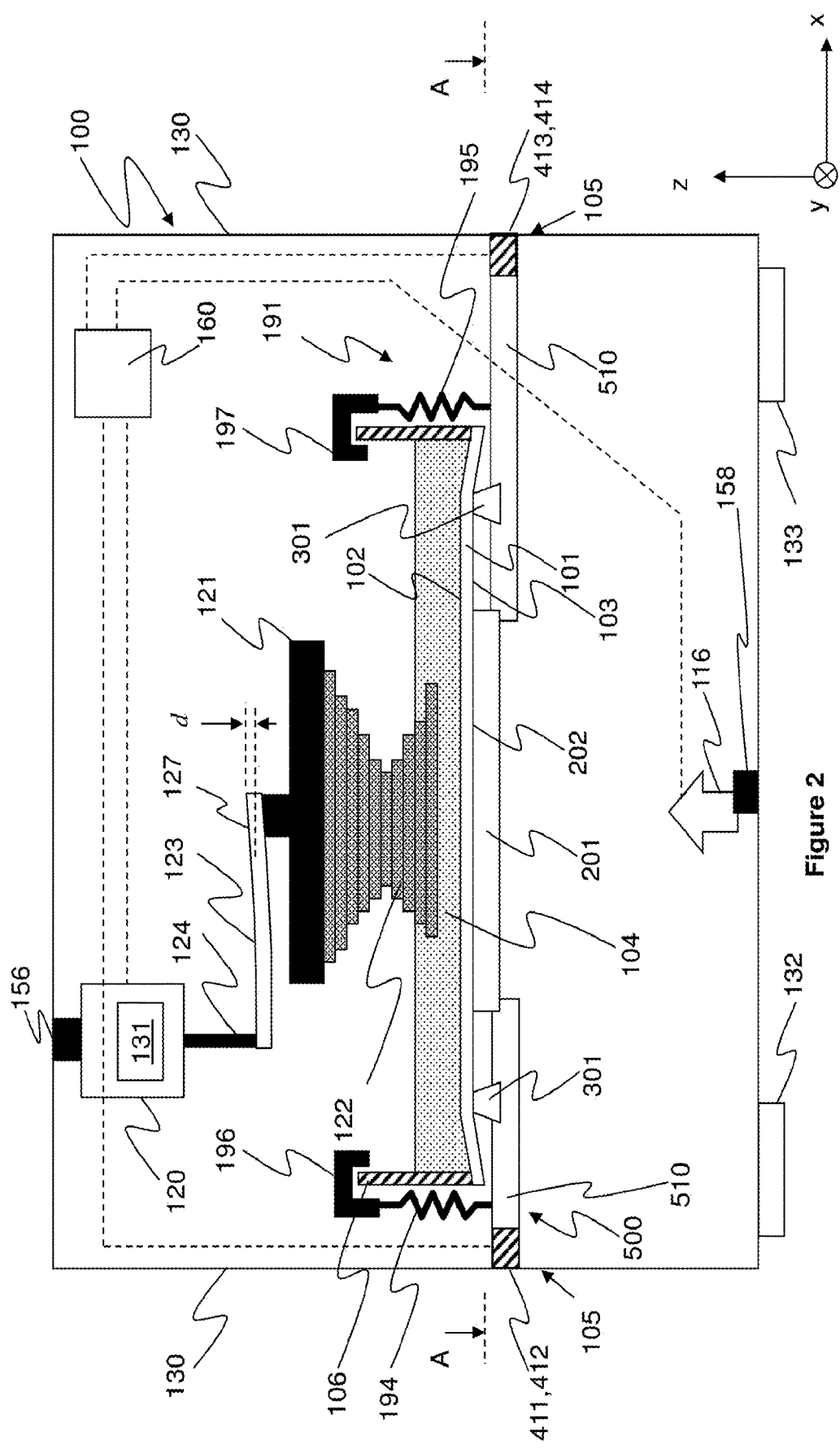

The force is generated by the positioner 120 when, for example, the distance between the platform 121 and the material receiving surface 102 is reduced. As shown in FIG. 2, the stereolithographic object being made 122 is moved into the material 104 by operation of the positioner 120, which displaces material 104 between the last formed section 125 (and so the platform 121) and the material receiving surface 102. The force comprises a material displacement force when the stereolithographic object being made 122 is moved through the material 104. The material 104 is viscous and so resists being squeezed out of the gap between the object being made 122 (and so the platform 121) and the material receiving surface 102. Consequently, a material displacement force is required to squeeze the material 104 out of the gap between the last formed section 125 (and so the platform 121) and the material receiving surface 102. The material displacement force, however, results in a reactive force transmitted to at least one member 123, 124, 120, 156, 130, 105, 510, 201, 101 of a mechanical linkage between the platform 121 and the material receiving surface 102. The at least one member 123, 124,120, 156, 130, 105, 510, 201, 101 is deformed by the reaction to the material displacement force. The deformation is an elastic deformation. The reactive force pushes the platform 121 and the material receiving surface 102 apart. FIG. 2 shows the deformation of the limb 123, the distal end 127 of which is deflected away from the material receiving surface 102 by a deflection distance d. The positioner 120 has a linear encoder 131 that generates a positioner position value communicated to the control system 160. The distance information indicative of the distance between the platform 121 and the material receiving surface 102 can be estimated using the positioner position value, however, an error is generally introduced by the deformation of the least one member 123, 124, 120, 156, 130, 105, 510, 201, 101. The deflection distance d is not easily directly measurable because it may be of the order of 1 μm-200 μm, for example, and does not change the positioner position value. Without further information and examples of methods described herein, the control system 160 would be unable to exactly determine when a layer of material 104 of the required thickness has been formed.

The control system 160 is configured to generate distance information by correcting for the distance information error caused by the deformation. The apparatus 100 comprises memory 240 which is part of, in this but not all embodiments, the control system 160. Stored in the memory 240 is distance error correction information. The control system uses the distance error correction information to correct the distance information error. The deflection amount d is estimated by the control system 160 using the force information generated by force sensing system 105 and a two-column lookup table characterizing the relationship between the force measured by the force sensing system 105 and the deflection amount d. Alternatively, the lookup table may have a three-column lookup table, relating positioner position value, a value of force information, and a value of distance information without the deformation induced error. Alternatively, the distance error correction information may be calculated by the control system 160 using a mathematical function, for example a function describing a curve or stepped function. The distance error correction information may generally take any suitable and desired form.

Figure 18:
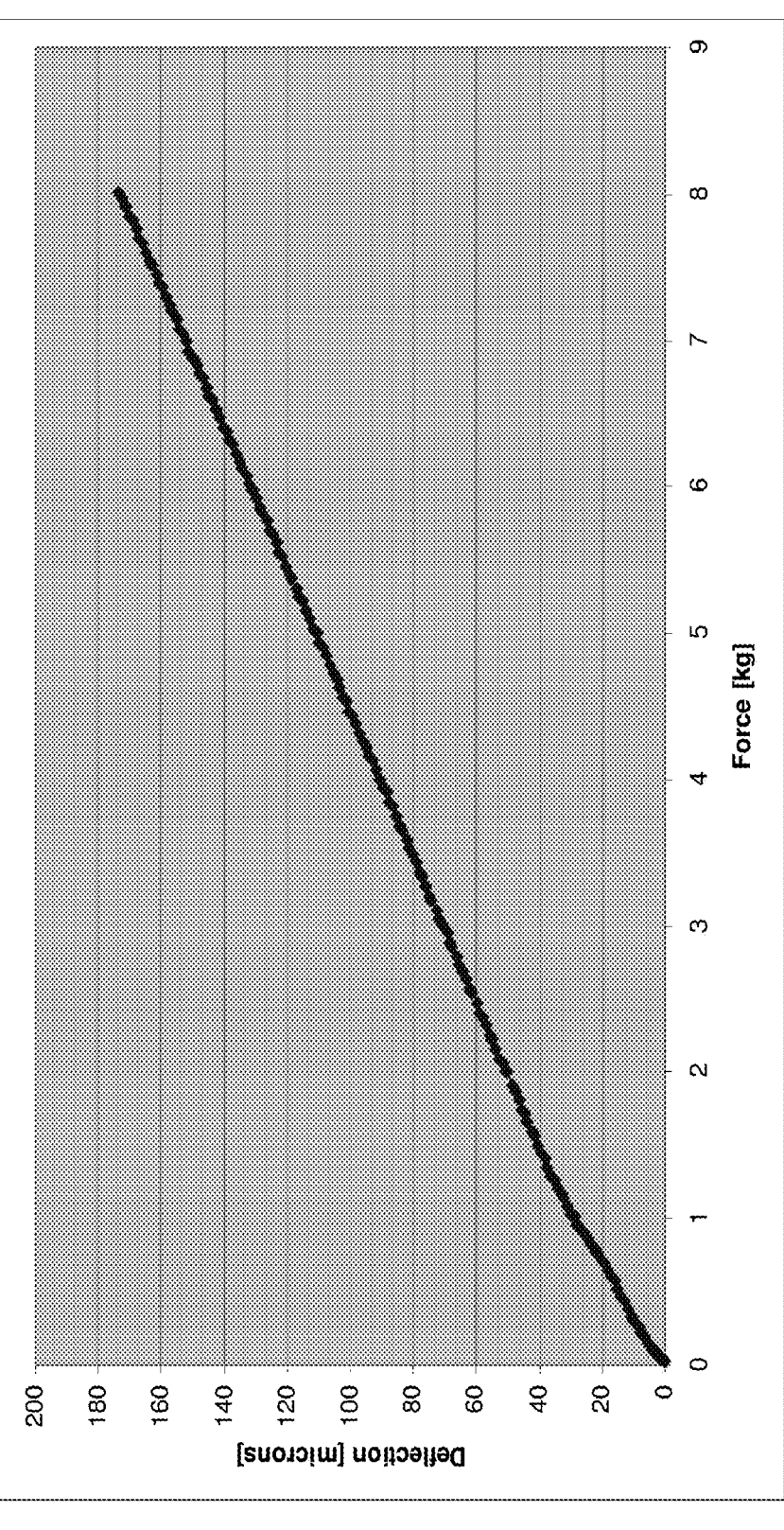
FIG. 18 shows a graph of empirical data relating force and deflection in an embodiment of an apparatus for making a stereolithographic object.

The control system 160 is configured to execute a method for empirically generating the distance error correction information, however the error correction information may be alternatively generated from a mathematical model. Alternatively, the distance error correction information may be determined without use of apparatus 100 and subsequently loaded into memory 240. The steps of one example of a method for empirically generating the distance error correction information is now disclosed. A step comprises engaging the platform 121 with a stop 201 in the form of a material hardening radiation transparent window. The material hardening radiation transparent window 201 is in the form of a material hardening radiation transparent plate. A flexible element 101 in the form of a material hardening radiation transparent sheet comprising the material receiving surface 102 is generally but not necessarily first removed (or alternatively the stop may be flexible element 101 and the window 201). The stop may take an alternative form and be temporarily introduced between the platform 121 and the window 201. A step comprises generating force information indicative of a force transmitted between the platform 121 and the stop 201 for each of a plurality of positioner positions. Each of the plurality of positioner positions nominally position the platform 121 at distances below the stop 201, resulting in deflections in the apparatus 100 equivalent to the distances. The force information is generated by the force sensing system 105, however it may alternatively be generated using a force sensor removably disposed intermediate the platform 121 and the stop 201, for example. An example graph of force versus deflection data experimentally obtained from an embodiment is shown in FIG. 18. A deflection of around 27 microns produces a force of around 1 kg in the force sensing system, and a deflection of around 170 microns produces a force of around 8 kg. During typical operation of embodiments, the forces may be in the order of 10 kg while the required layer accuracy is of the order of 10 microns. Thus, the deflections encountered in an embodiment may be an order of magnitude greater than the precision required. Such deflections would detrimentally impact the fidelity of parts built by the apparatus, if counteracting measures were not taken.

The advantage of the apparatus 100 determining the distance error correction information directly is that it incorporates the deflections in the entire mechanical linkage between the build platform 121 and the material solidifying radiation transparent glass plate 201. It may also account for different deformations experienced by different examples of apparatus 100 due to manufacturing imperfections. When the material hardening radiation is 385 nm wavelength light, for example, the window 201 may comprise a 6 mm thick plate of fused silica. The edges of the window 201 may be beveled, or even rounded, to reduce the risk of a scratch or other mark being made on the underside surface 103 of the flexible element 101.

During operation, the deflection amount d is estimated from the force indicated by the force information and the lookup table. Interpolation of lookup table data is generally but not necessarily used. Alternatively, the force information may be first rounded to the same level of precision as the force data in the look-up table, or the look up table may be stepped through until the nearest force value entry is identified. The estimation of deflection amount d begins by measuring a baseline signal from the force sending system 105 while the stereolithographic object being made 122 is positioned a suitable distance away from the material receiving surface 102 such that it does not exert any significant (or any) pressure on the material receiving surface 102. A typical distance may be around 2 mm, wherein the stereolithographic object 122 being made is immersed in the material 104. The baseline measurement may also allow the weight of the material 104 in the material vessel 108 and the weight of material displaced by the immersed object 122 to be subtracted from the force information, if necessary. Then, as the platform 121 approaches the material 104, the force sensed by the force sensing system 105 minus the baseline force gives a measure of the total reactive force. The reactive force is used as input to the lookup table to estimate the corresponding deformation (e.g. deflection) amount. The actual distance of the platform 121 from the material receiving surface 102 is then estimated as the position of the positioner 121 plus the deflection amount from the lookup table. If the motion is away from the material receiving surface 102 and the reactive force is negative, the deflection would change sign and the estimated position may be the position of the positioner minus the estimated deformation.

The estimated position allows the apparatus 100 to be controlled more accurately as it provides a means for determining, with high precision, the thickness of a layer of material 104 between the stereolithographic object 122 being made and the material receiving surface 102. This may result in a stereolithographic object 122 that may better reflect instructions received by the control system 160 that specify the stereolithographic object 122.

The force sensing system 105 comprises a plurality of force sensing elements in the form of four load cells 411, 412, 413 and 414. There may be more or less force sensing elements in other embodiments, and in one embodiment there is a single force sensing element. The plurality of force sensing elements may be spaced apart in at least one direction, and in this embodiment two directions (x and y) that are orthogonal to a normal (z direction) to the material receiving surface. The load cells 411, 412, 413 and 414 may be piezoelectric, or generally any suitable type, however in the present embodiment they are resistive load cells in the form of strain gauges that have an electrical resistance between two electrical terminals that are proportional to a magnitude of a force applied normal to a force receiving surface. The force sensing system 105 comprises electronic circuitry that measures the resistance of the load cells and generates a digital force signal indicative of the force that is communicated to the control system 160.

The force sensing system 105 engages the structure 510 to a chassis 130, to which the positioner 120 is attached. Engagement may be via attachment with, for example, fasteners or adhesive, or by, as in the present embodiment, providing a seat for the structure so that the structure 510 is suspended on the force sensing elements 411, 412, 413, 414. In turn, the force sensing system 105 may be attached to the chassis 130 or received in a seat provided by the chassis. Other forms of engagement may be provided. The mechanical linkage comprises, in this embodiment, the flexible element 101, the structure 510, the force sensing system 105, the chassis 130, bracket 156, the positioner 120, and limb 123. Any one or more of these members may deform. Consequently, the force sensing system 105 is operationally coupled to these members of the linkage and the force is transmitted by at least some of these members to the force sensing system 105.

The control system 160 is configured to use the force information to control the magnitude of the force to, for example, reduce the time taken to make the stereolithographic object 122. It may take an inconveniently long time for the material 104 between the material receiving surface 102 and the object being made 121 to be displaced during reduction of the distance between the platform 121 and the material receiving surface 102, and the mechanical linkage to return to its non-deformed shape as the force decreases towards zero. This time may be in the order of several minutes depending on one or more properties of the material (e.g. viscosity), the area of the previously formed section or sections of the stereolithographic object 122 being made, the rigidity of the mechanical linkage, and the section thickness which is desired to be formed. This generally may add to the fabrication time and diminish productivity.

The force applied by the limb 123 to displace ("squeeze out") the material 104 between the stereolithographic object being made 122 and material receiving surface 102 decreases as the mechanical linkage returns to its non-deformed shape. This is similar to the decrease in force exerted by a spring as it returns to its non-deformed state. For example, the deflection d of the limb 123 may asymptotically approach zero. This is a contributing factor to what may be an inconveniently long amount of time to displace the material 104.

Figure 3:
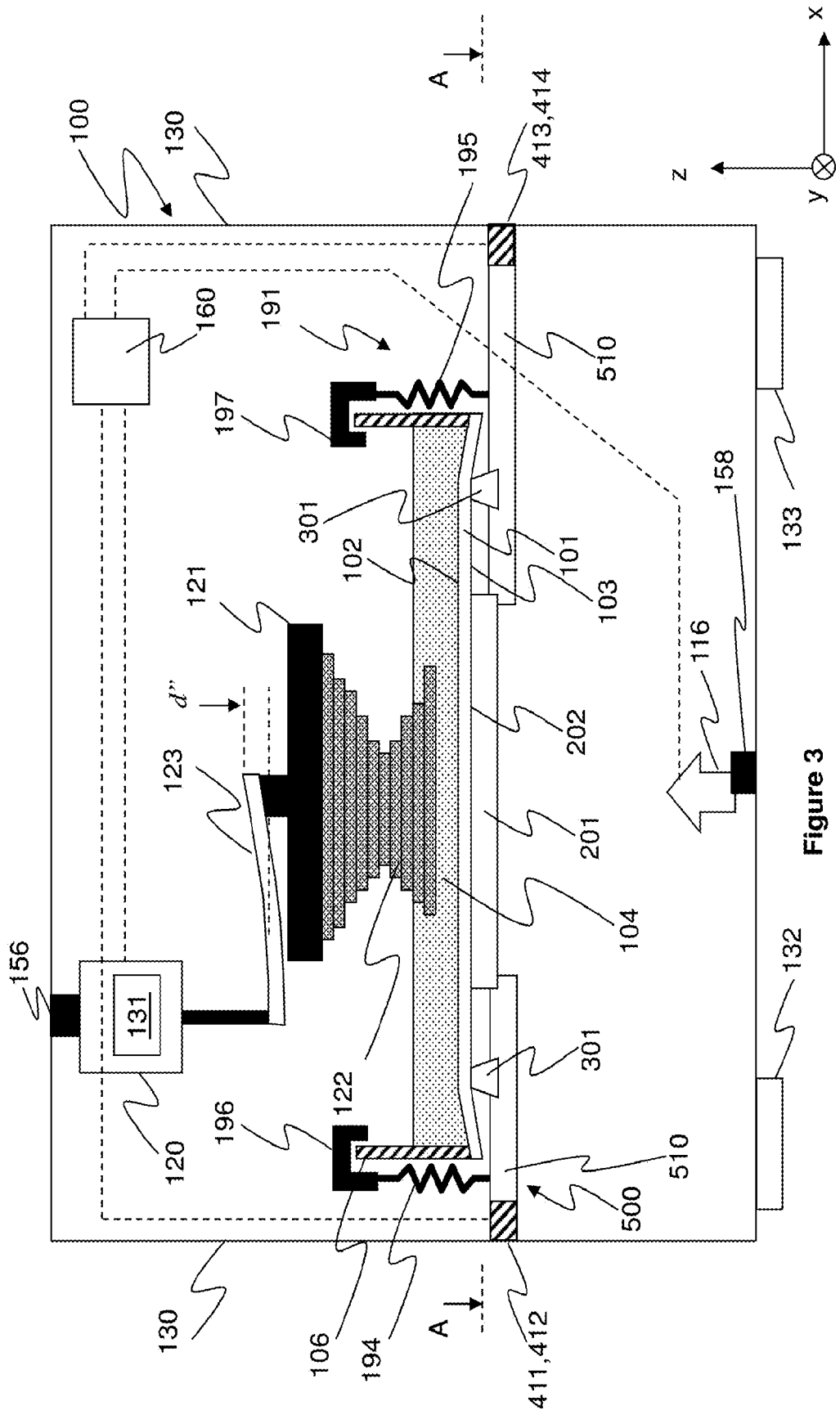

Additional force may be applied to increase the rate the material 104 is displaced. The control system 160 is configured to move the positioner 120 to a position such that the force is greater than when the control system 160 moves the positioner 120 to a position for making a section of the stereolithographic object 122—that is, when the distance between the stereolithographic object 122 being made and the material receiving surface 102 is the thickness of one section of the stereolithographic object 122 in the absence of apparatus deflections. The control system 160 operates the positioner 120 such that it takes a target position which would be below the target position necessary to achieve the required section thickness in the absence of apparatus deflections. This situation is shown in FIG. 3. In this case, the deflection of the bracket 123 is increased from d to d". The greater applied force results in greater deformation.

Figure 14:
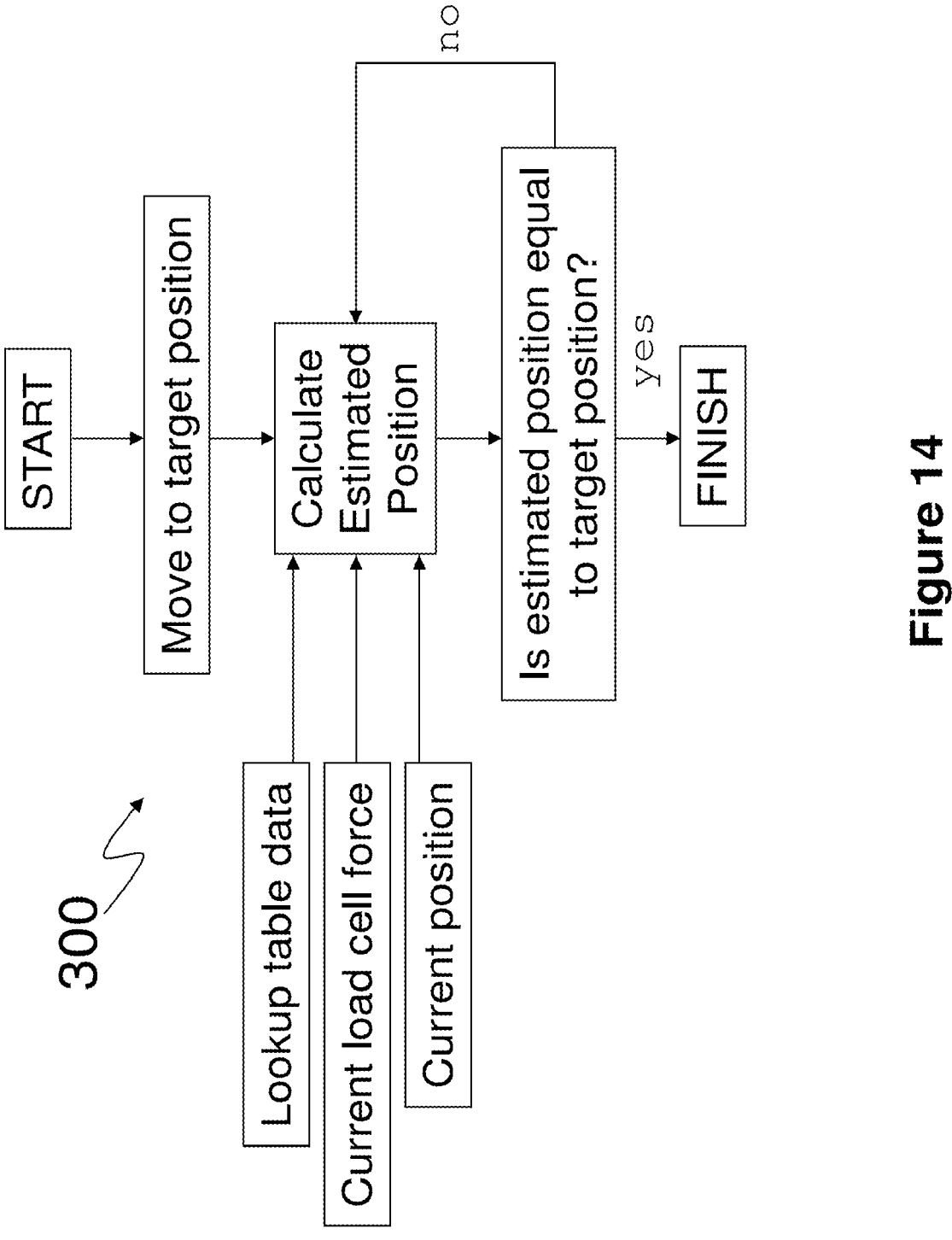
FIGS. 14 and 15 shows example flow charts of embodiments of methods.

Accordingly, the control system 160 is configured to execute steps of an example of a method for displacing the material 104 between the material receiving surface 102 and the platform 121. In a step, the control system 160 operates the positioner 120 to move platform 121—and so the stereolithographic object 122 being made-towards the material receiving surface 102. The control system 160 operates the positioner 120 to increase the deformation of the at least one member 123, 130 until the magnitude of the force indicated by the force information is at least one of equal to and greater than a maximum force magnitude value. The control system 160 determines whether the distance information satisfies a distance condition, and if so satisfied stops the positioner. In this but not all embodiments, the control system 160 may reverse the motion of the positioner and subsequently stop the positioner at a position wherein the at least one member is not deformed. The distance condition comprises, in one mode of operation, that the distance of the platform and the material receiving surface indicated by the distance information is within a predefined distance range. The predefined range may correspond to a distance between the stereolithographic object being made 122 and the material receiving surface 102 being the thickness of one section of the object being made 122, to within a tolerance. Alternatively, for example, the distance condition comprises that the distance of the platform and the material receiving surface indicated by the distance information is a predefined distance, for example. FIG. 14 shows a flow chart indicated by the numeral 300 for an embodiment of the method.

During execution of the steps of the example method for displacing the material 104 between the material receiving surface 102 and the platform 121, the positioner 120 may have moved the positioner such that the distance between the platform and the material receiving surface is less than a predefined distance, for example less than the lower end of the predefined distance range as described above or another predefined distance. The control system 160 is configured to determine whether the distance indicated by the distance information is less than a predefined minimum distance, and if so increase the distance so that the distance condition is satisfied.

Figure 4:
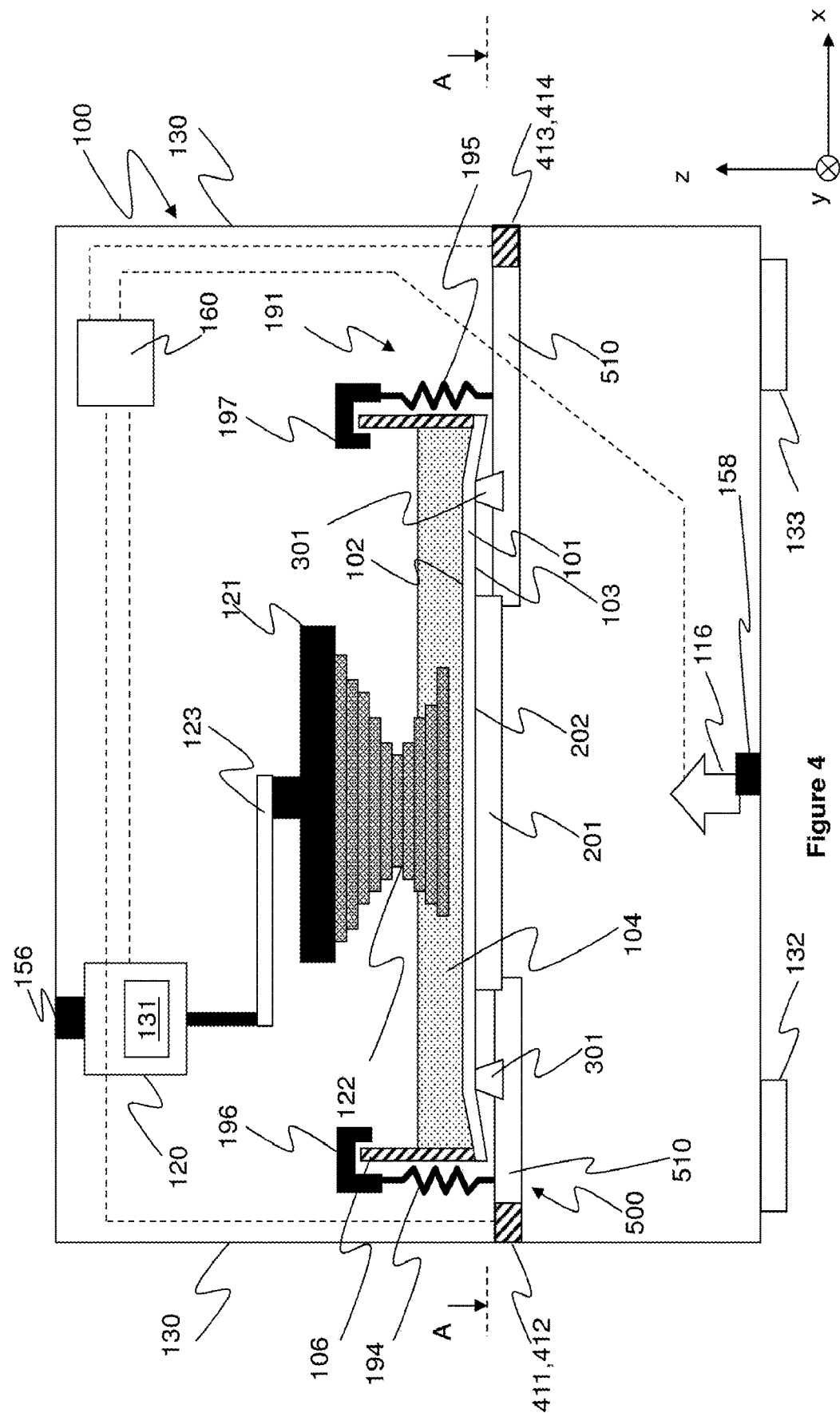

When the desired distance between the platform and the material receiving surface 102 is achieved, the positioner 120 is moved to remove the deformation, as shown in FIG. 4. The stereolithographic object 122 being made is positioned at one section-thickness above the material receiving surface 102 when the flexible element 101 is in contact with the reference surface 202.

Apparatus 100 was constructed by the applicant. A rectangular section having dimensions 125 mm by 70 mm was brought to within 50 μm (the distance condition) of the material receiving surface 102 covered with a photohardenable liquid material 104 having a viscosity of around 2500 centipoise. When the positioner was moved to a final position and the mechanical linkage deformed, with the initial displacement force of 0.5 kg (limited by the stiffness of the apparatus), it took about 6.8 minutes for the deformation to relax and the distance condition to be satisfied. In comparison, when the example of the method for displacing the material 104 was employed, the same distance condition was attained in 1.2 minutes by applying a consistent force of 8.5 kg. When the distance condition was attained in this example, the apparatus' deflection was estimated to be 185 microns and the positioner was then moved upwards by 185 microns to relieve the deflection. The decrease in the time taken to satisfy the distance condition may improve the productivity of the apparatus whilst not sacrificing accuracy.

In some embodiments the control system 160 may utilize force information to control the target position of the positioner 120 and thereby control the force applied to the stereolithographic object 122 being made. In some embodiments it may be desirable to control the force applied to the stereolithographic object 122 being made, for example when the stereolithographic object 122 being made is fragile, to prevent damage to the stereolithographic object 122 being made. In other embodiments it may be of greater utility for the control system 160 to control the pressure applied to the stereolithographic object 122 being made, the pressure being the ratio of the applied force to the cross-sectional area of the section being formed. In this manner, the applied force may be different when forming different sections of the object 122.

Figure 15:
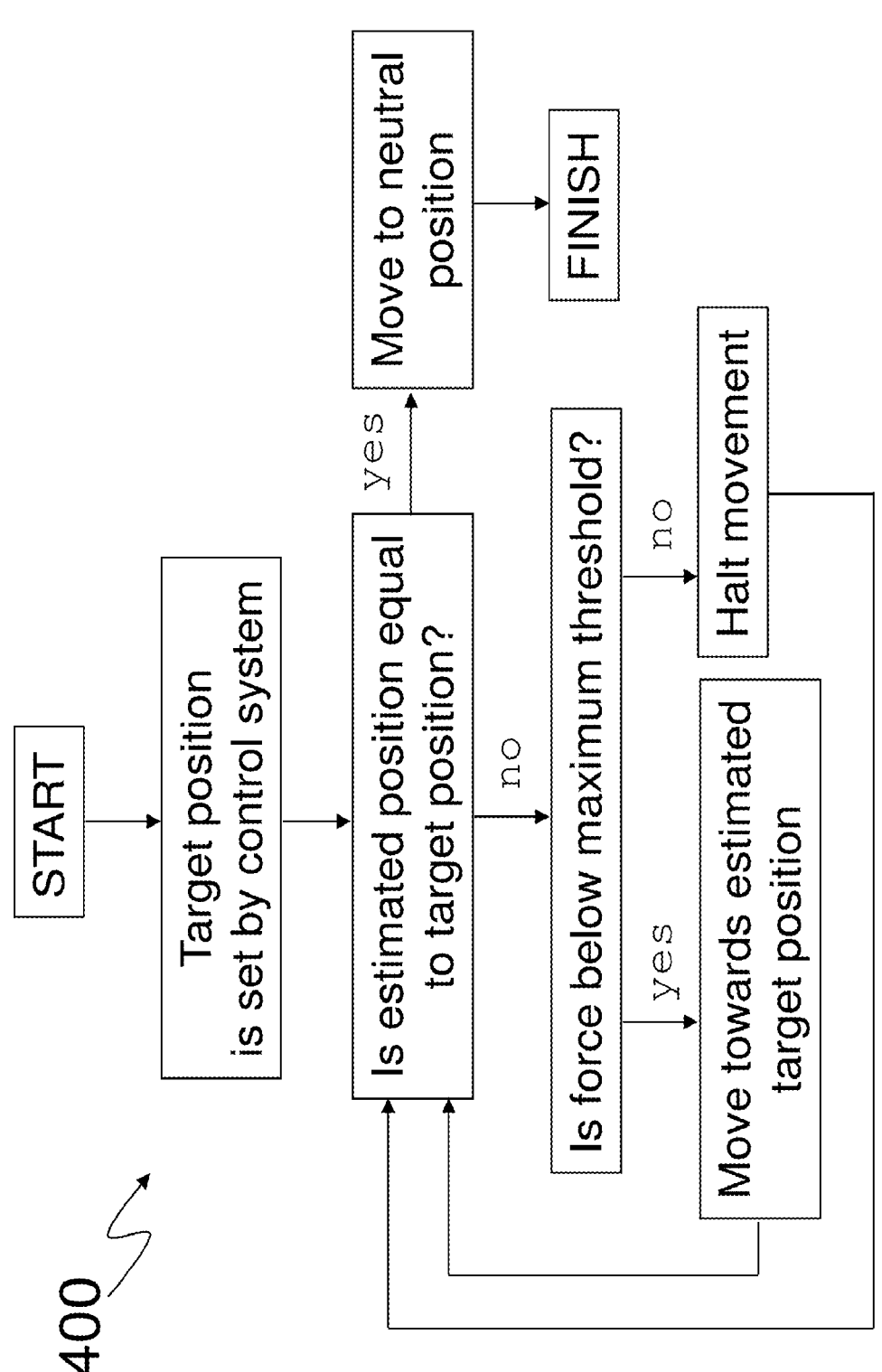

The steps of an example of a method for controlling the force is now described. In a step, a target position is set by the control system 160. In a step, the positioner moves the stereolithographic object being made 122 towards the material reference surface 102 while monitoring the force information. In a step, the movement of the positioner 121 is stopped if the force indicated by the force information exceeds the maximum allowable force. In a step, the motion towards the target position is continued when the force indicated by the force information is less than the maximum allowable force. When the target position is reached the movement is stopped. FIG. 15 is a flow chart of an embodiment of the method.

Figure 13:
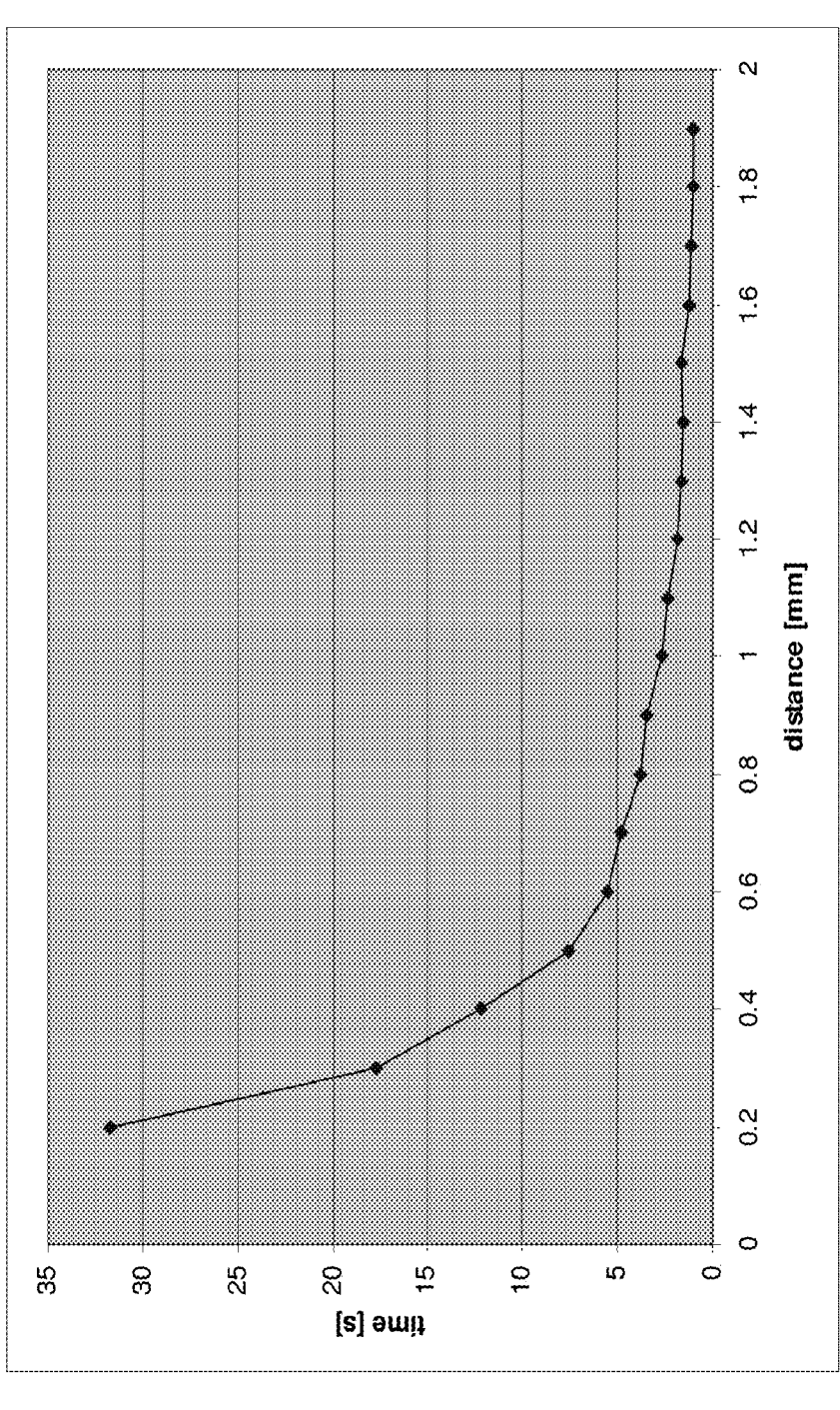
FIG. 13 shows a graph of empirical data used to determine a viscosity distance value.

In determining the appropriate force to apply when forming a section of the stereolithographic object 122, the sections formed prior to the last formed section 125 of the stereolithographic object 122 may influence the force used to bring the object adjacent to the surface 102. The control system 160 is configured to receive area information indicative of an area of at least one section 124, 129 of the stereolithographic object 122 and control the magnitude of the force using the area information. When determining the magnitude of the force to apply, a function of the cross-sectional areas of the previous sections may be used. For example, it may be appropriate to use a weighted average cross-sectional area of the 10 previous sections as the basis area on which to calculate the applied force from the allowed pressure to be applied to the object. Alternatively, a finite-impulse-response filter, an infinite-impulse-response filter, or any other suitable type of filter may be applied to the previous cross-sectional area data to determine the basis area. The control system 160 is configured to give non-zero weightings to each of a plurality of areas of a plurality of sections of the stereolithographic object when controlling the magnitude of the force using the area information. The number of previous sections appropriate to use in the weighted calculation may depend on the viscosity of the resin and the distance over which a viscous force may be exerted by a surface brought adjacent to another in the presence of the material 104. In the present apparatus we refer to this distance as the viscosity distance of a resin. Viscosity distance can be calculated experimentally on the apparatus 100 using the positioner 120 and force sensing system 105. The positioner 120 is controlled for bringing the platform 121 to a defined distance from the sheet. This produces a momentary force in the force sensing system as the viscous material is displaced, which resolves (that is, reduces towards zero) after a period of time. The positioner then moves the build platform towards the sheet in set increments, for example 0.1 mm increments, in each case then pausing to measure the time taken for the increased force sensed exerted on the force sensing system 105 to dissipate due to material 104 flowing out of the gap between the two surfaces. An example curve of dissipation time versus distance from the sheet is shown in FIG. 13. The viscosity distance is defined as the distance at which the deformation induced forces relax in a given time. For the example curve shown in FIG. 13 if we define the resolving time as 5 seconds, which may be a reasonable waiting time between sections during a stereolithographic process, the viscosity distance would be defined as approximately 0.6 mm. If an object having cross sectional area equal to that of the platform 121 is brought to within 0.6 mm of a surface in the presence of this material 104, the force exerted on the surface would resolve (that is, fall to around zero) in around 5 seconds. This gives a practical unit of measure of the viscosity of the material 104 and the distance over which prior sections could exert a significant force against the force sensing system 105, specifically the force sensing elements 411, 412, 413 414. The non-zero weightings are determined by the control system 160 using viscosity information indicative of the viscosity of the material, and in this but not all embodiments in the form of the viscosity distance. The measurement of the viscosity distance value may be automated by the control system.

Taken together, force sensing elements 411, 412, 413, 414 may operate as a position-sensitive detector which can measure the position and magnitude of forces applied to the mounting platform in two dimensions. For example, the plurality of force sensing elements 411, 412, 413, 414 permits positional information indicative of the location of solid debris between the object being made 122 and the material receiving surface 102. The force information is indicative of a portion of the force sensed by each of the plurality of force sensing elements 411, 412, 413, 414. If the forces applied to the four force sensing elements are F1, F2, F3, F4, and the force sensing elements are located at corresponding positions coordinates L1, L3, L3, L4—which are expressed as vectors (x,y)—where the origin is at the geometric center of mass of the force sensing elements' locations, and the sum of the forces sensed by the plurality of force sensing elements 411, 412, 413, 414 is F, the location of the debris detected is estimated as the weighted position using the following example of a force center function:

$$(xc,yc)=L1{*}F1/F+L2{*}F2/F+L3{*}F3/F+L4{*}F4/F$$

The control system 160 is configured to calculate (xc,yc) using the above force center function and the force information to determine a position on the material receiving surface 102 that the force is applied to.

The control system 160 of apparatus 100 may be configured to detect higher than expected forces during fabrication, for example as a result of the debris. In such circumstances, the fabrication may be halted to prevent damage to the apparatus. The control system is configured to generate a debris alert for a user. The alerted user may be provided with a two-dimensional position of the debris on the material receiving surface 102 generated by the control system 160. This may be of particular utility when debris is obscured by opaque photohardenable material 104. The notified user may remove the debris, having been alerted of its presence. The fabrication process may then continue, which may prevent the process from being restarted, wasting time and material 104.

A processor within the control system 160 uses the force information to determine whether the force indicated satisfies a material weight condition. When there are no material displacement forces applied, the force is indicative of the weight of the structure 510, the material vessel 108 and the material 104 therein. The weight of the material 104 is determined by the processor 160 by subtracting an empty-vessel reading. The processor generates an alert if it determines that the weight of the material satisfies a material weight condition, for example the weight of the material is less than a minimum material weight value. The control system 160 is configured to pause the fabrication process when it is determined that the material 104 in the vessel 108 is insufficient and needs replenishment. After replenishment, the fabrication process may be continued by the control system 160 when it determines a sufficient material weight condition is satisfied, for example, the material exceeds a minimum material weight value. This may reduce the likelihood of failed builds due to insufficient material.

Figure 16:
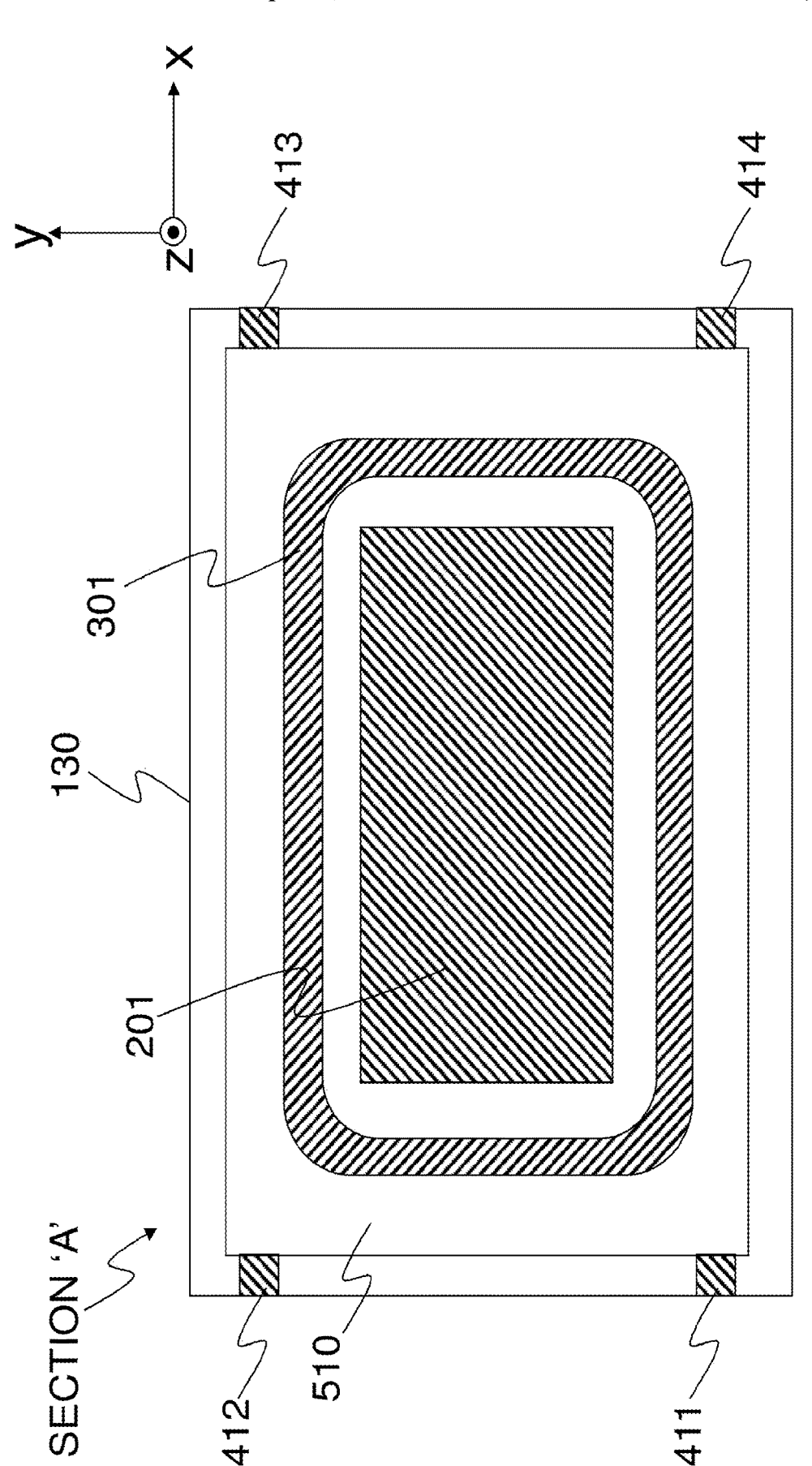
FIGS. 16 and 17 show section views of embodiments of an apparatus for making a stereolithographic object.
Figure 17:
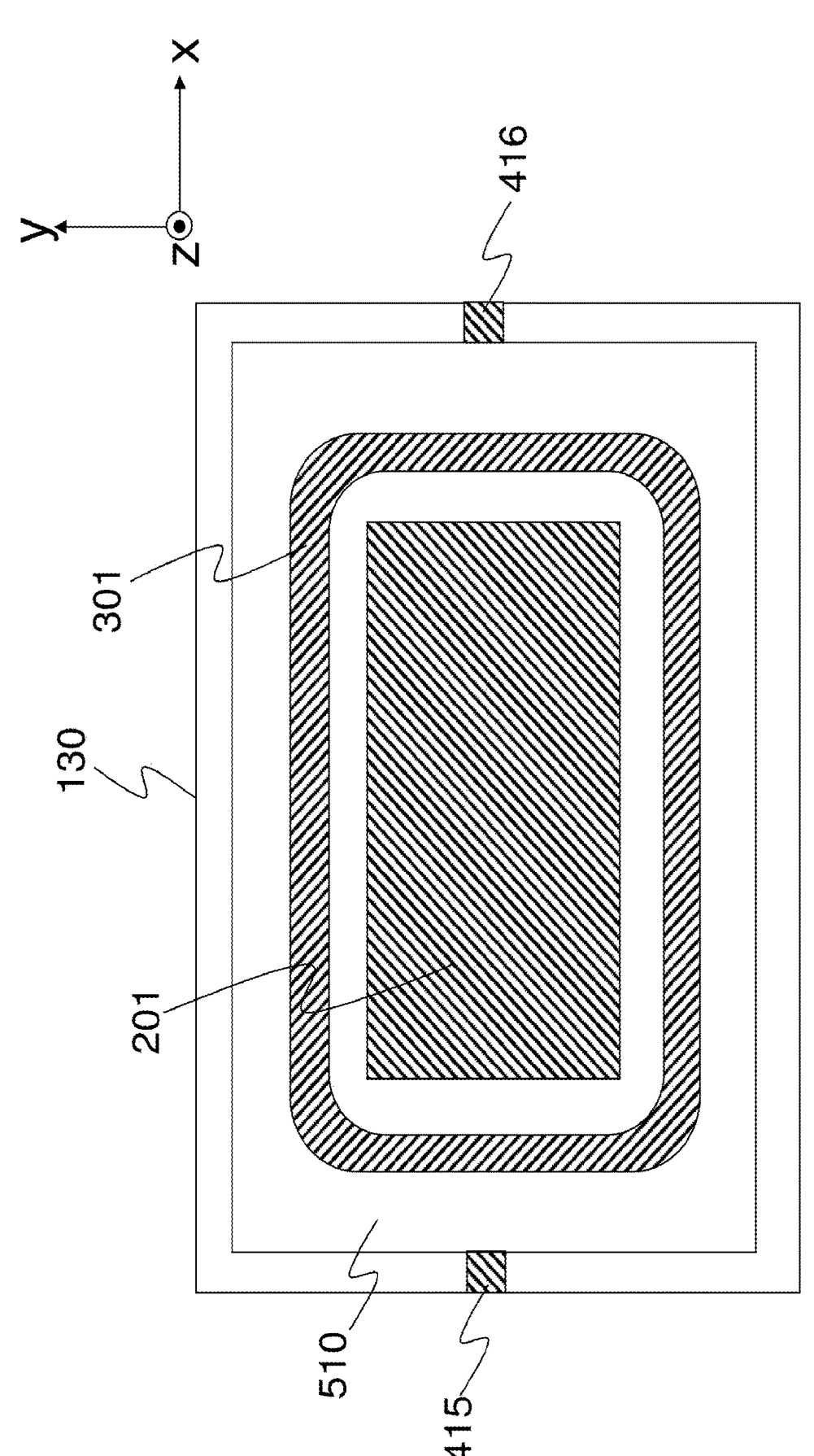

The use of a plurality of force sensing elements 411, 412, 413, 414 may provide redundant information. Forces may be located in two dimensions with only three suitably positioned force sensing elements. In other embodiments, a single force sensing element suitably mounted below the mounting platform 510 may be sufficient to provide force only information. Redundant information may allow for more precise measurement through noise filtering. Using a plurality of force sensing elements below the mounting platform 510 also provides the opportunity to mount the mounting platform without cantilevering, which improves the robustness and stiffness of the apparatus 100. This is shown in FIGS. 1-7, and also FIG. 16 which shows section-A of the apparatus from FIG. 1. A section of an alternative embodiment is shown in FIG. 17 which employs a pair of force sensing elements 415 and 416 spaced apart to support the mounting platform 510. In this embodiment, the mounting platform 510 is beneficially mounted without cantilevering and one-dimensional spatial information regarding the distribution of forces can be derived from the load cell readings using the methods described herein.

Further details of apparatus 100 will now be described, which may be shared by other embodiments.

The apparatus 100 has a flexible element 101 in the form of a substantially transparent sheet with upward facing material receiving surface 102, however in other embodiments the material receiving surface 102 may be downward facing. The material 104 is in the form of a layer of photohardenable liquid 104 disposed on the material receiving surface 102 and that hardens when exposed to a material solidifying radiation. The material solidifying radiation may be visible or invisible light (ultraviolet light, for example). Example wavelengths of suitable light include 355 nm, 385 nm, and 405 nm. In some embodiments, radiation sources other than light may be used. For example, the radiation source may be ionizing or non-ionizing radiation.

The photohardenable liquid may comprise a mixture of acrylate monomers and oligomers, photoinitiators, colourants and stabilizers such that the mixture polymerizes when exposed to suitable light. Example liquids include Somos NEXT from DSM Somos. USA, and KZ-1860-CL from Allied PhotoPolymers, USA. In alternative embodiments, the material may comprise a powder such as a fluidized polymer powder, or a paste. Any suitable material may be used.

Flexible element 101 may possess anti-stick properties in relation to the material 104 when it is cured in contact with the sheet. Suitable materials for sheet 101 include FEP fluoropolymer film manufactured by Du Pont, USA. The film may be of around 125 micrometers thickness, but may be thicker or thinner as appropriate. The sheets are flexible but may not be particularly elastic, having a Young's modulus of around 560 MPa. Generally, but not necessarily, a Young's modulus of between 100 and 1000 MPa may be suitable. Other examples of suitable materials include PFA fluoropolymer film and Teflon AF film, also manufactured by Du Pont. Still other examples of suitable sheet materials are silicone, polyethylene film, polyethylene terephthalate film, and cellulose acetate film. Generally, any suitable material may be used for the element.

In this embodiment, the flexible element 101 is not backed by another material or layer, and is homogeneous, that is has a uniform structure and composition throughout. In other embodiments the sheet may have a multi-laminate construction. For example, the sheet may comprise a layer of silicone bonded to a polyester film, the film providing a high Young's modulus and the silicone providing a superior nonstick surface in relation to the photohardenable material 104. Other materials or laminates of different materials may alternatively be used.

The flexible element 101 and side walls 106 form a vessel 108 in the form of a trough or dish for containing the material 104. The vessel 108 may have a volume sufficient to hold enough liquid to build an entire stereolithographic object without being replenished. Optionally, a conduit may connect the vessel and a supply of the material to replenish the material as it is consumed. The flexible element 101 forms the base of the vessel. The vessel 108 and material 104 contained therein can be easily removed from the apparatus and replaced with another vessel and other material, thus providing a convenient means for replacing damaged vessels or making objects from different materials.

A reference surface 202 additionally shapes the flexible element 101 to have it adopt a flat configuration (or any desired configuration, for example a curved configuration) or form while excess photohardenable liquid 104 is forced out of the gap between the previously hardened sections 122 and the flexible element 101. Support of the flexible element 101 by the reference surface 202 may allow for flat sections of consistent and precise thicknesses to be formed. In alternative embodiments, the vessel 108 may incorporate the plate 201, flexible element 101, and side walls 106 to form a unitary construction with rigid base which may be removable from the apparatus.

The thickness of one section is typically in the range of 10 micrometers to 250 micrometers, but it may be less if particularly fine fabrication resolution is required, and greater if a relatively coarse fabrication resolution is required.

The apparatus 100 has member 301 that supports the flexible element around a perimeter of the transparent plate 201 having an uppermost reference surface 202. The underside of the flexible element 101 is biased towards member 301 with biasing elements in the form of spring elements 194, 195 which causes the flexible element 101 to be tensioned in both the x and y directions. The reference surface 202 is positioned below the flexible element 101 which may prevent it from sagging. In some embodiments the reference surface 202 may be adjacent the flexible element 101.

The apparatus 100 is configured such that in use the flexible element 101 is horizontally orientated. The chassis 130 has attached feet 132, 133 configured to support the chassis 130 above a surface such as a bench, and the flexible element 101 is mounted relative to the chassis 130 so that when the chassis 130 is so supported the flexible element 130 has a horizontal orientation. In other embodiments, the material receiving surface 102 may be inclined at up to 45 degrees to the horizontal (that is, the surface is upwardly facing), provided that the vessel walls 106 are sufficiently high to contain the material 104. Mounting brackets 152, 154, 156, 158 may be used to ensure that apparatus components are maintained in their correct position and orientation relative to the chassis 130. A mounting platform 510 may serve to mount apparatus components and form a fluid-tight division between the upper and lower regions of the apparatus 100 to prevent ingress of any spilled material 104 which may damage delicate components.

Figure 10:
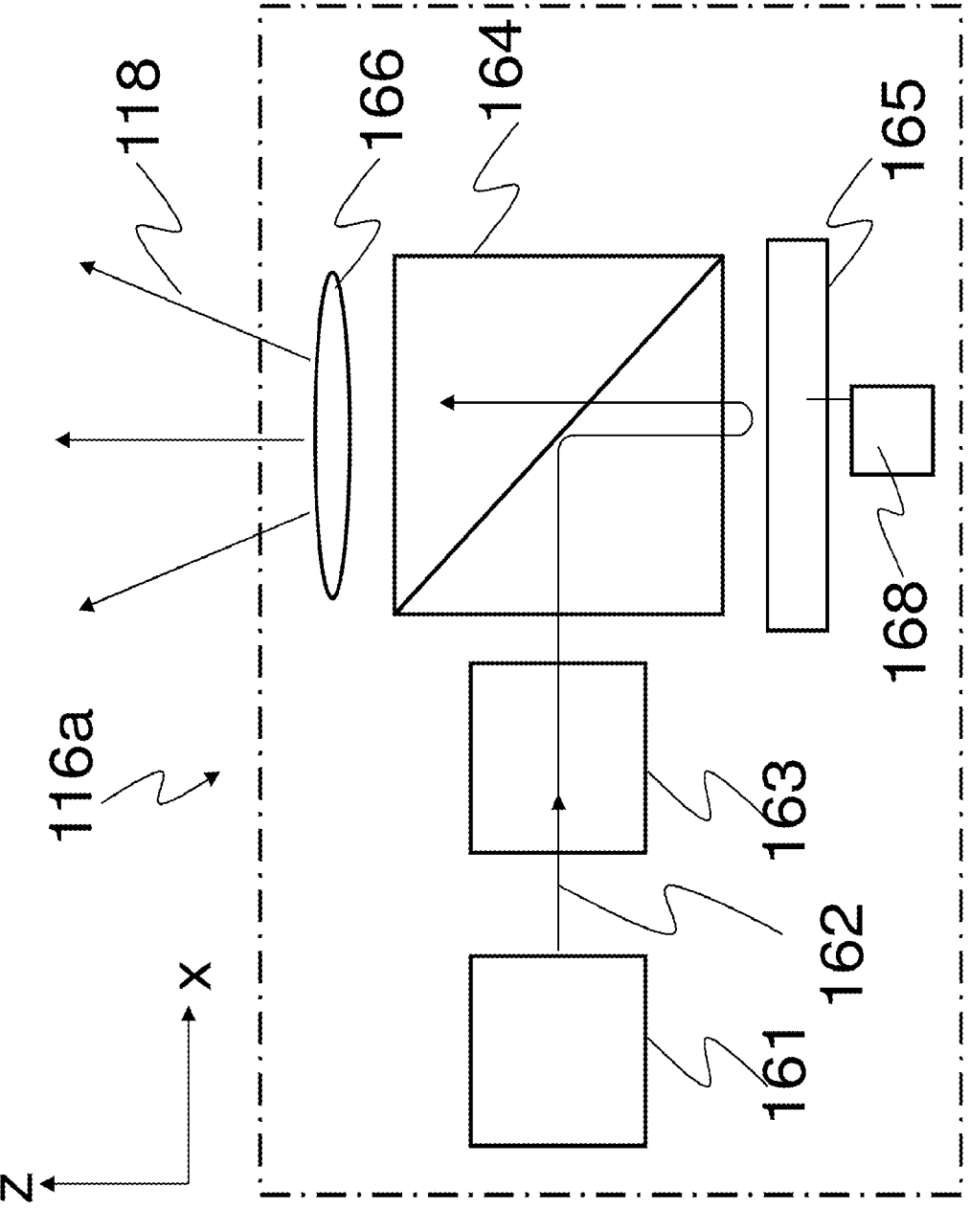
FIGS. 10 to 12 show schematic views of example radiation sources that may form part of a device for making a stereolithographic object.
Figure 11:
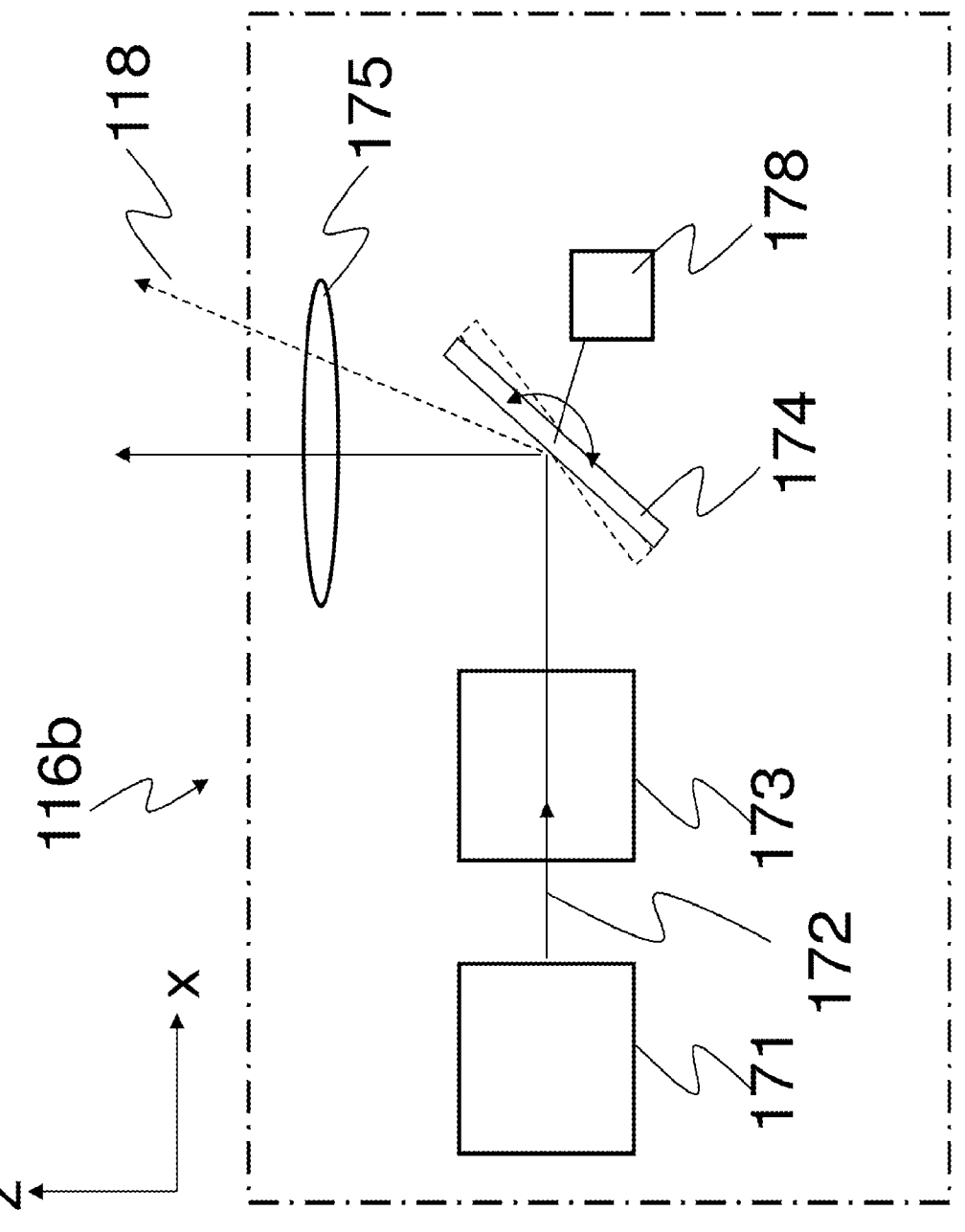
Figure 12:
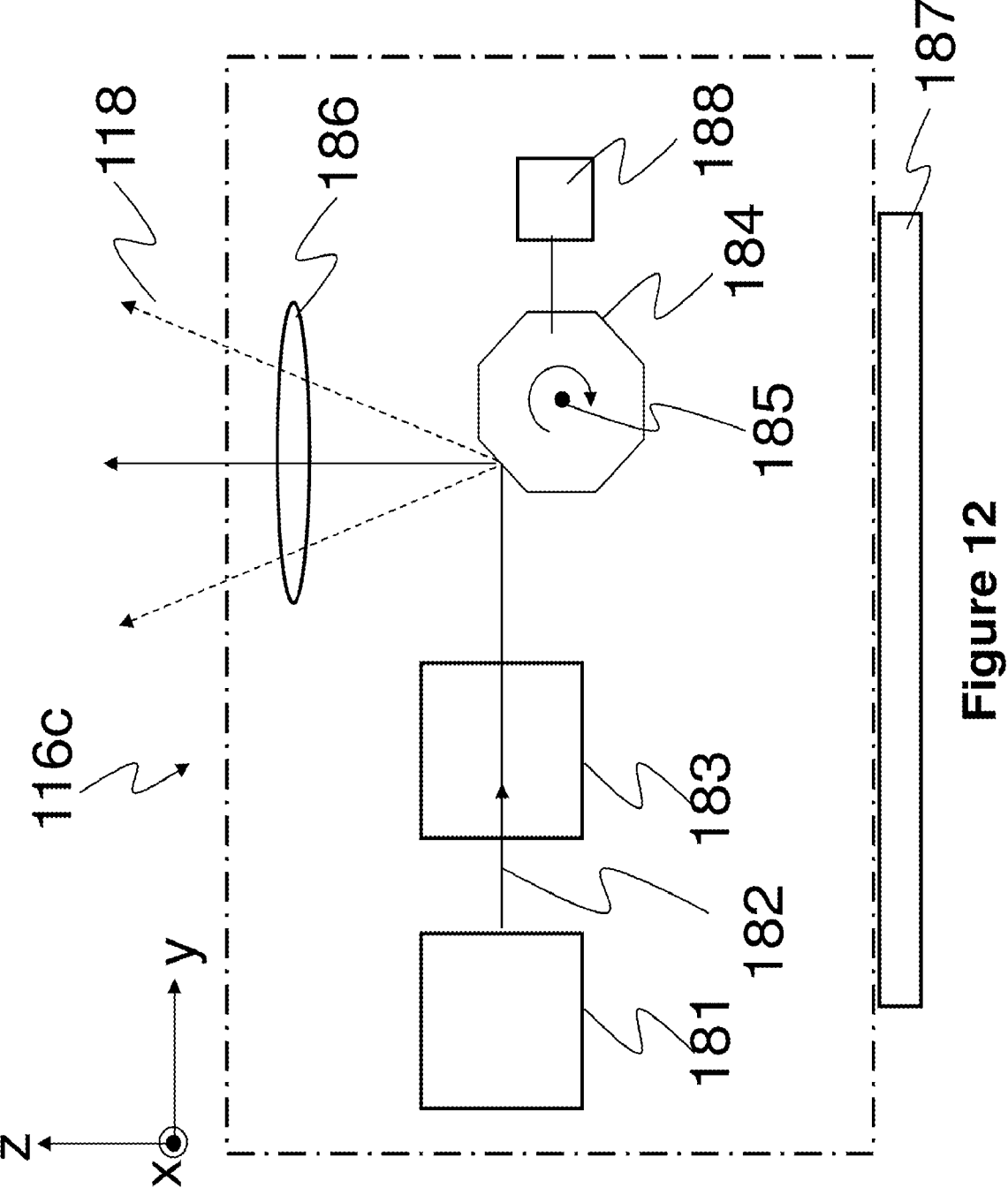

The material solidifying radiation source 116 comprises a light source, and may be activated by the control system 160 so that it emits spatially and/or structured light 118 capable of selectively hardening areas of the material 104 to form a section of the stereolithographic object 122. Material solidifying radiation source 116 may, for example, incorporate a light manipulator such as an image projection system depicted in FIG. 10 and generally indicated with the numeral 116 a, comprising light source 161 emitting light 162, relay optics 163, turning prism 164, spatial light modulator 165 controllable by control system 168, and projection lens 166. Alternatively, material solidifying radiation source 116 may be a light beam scanning apparatus depicted in FIG. 11 and generally indicated by the numeral 116 b, comprising a laser source 171 emitting light 172 of wavelength of around 350 nm, for example, collimating and/or focusing optics 173, scanning mirror 174 whose rotation is controllable in one or more axes by mirror controller 178, optionally a second controllable mirror not shown in the figure, and optionally a projection lens 175 such as an F-Theta lens. Control system 160 can be configured to scan the mirror 174 (coordinated with a second mirror, if present) in a raster scanning mode, or alternatively in a vector scanning mode. FIG. 12 shows a second type of beam scanning apparatus generally indicated by the numeral 116 c comprising a laser source 181 emitting light 182, collimating and/or focusing optics 183, polygon mirror 184 rotatable around an axis 185 and controllable by controller 188, and optionally a projection lens 186 such as an F-Theta lens. As the apparatus of 116 c may only scan light in the y-axis according to the coordinate system shown in FIG. 12, the apparatus resides on a translation stage 187 which can move the apparatus in the x-direction, enabling the projected light to address locations in the x and y dimensions. The translation stage may comprise any one or more of linear motors, drive belts, stepper motors, rack and pinion arrangements, for example, or generally any suitable components arranged to provide translation. Apparatus 116 c is suitable for operating in a raster scanning mode. The light source may, in some embodiments, comprise an incandescent light or light emitting diode, for example. Any suitable light source may be used.

Figure 9:
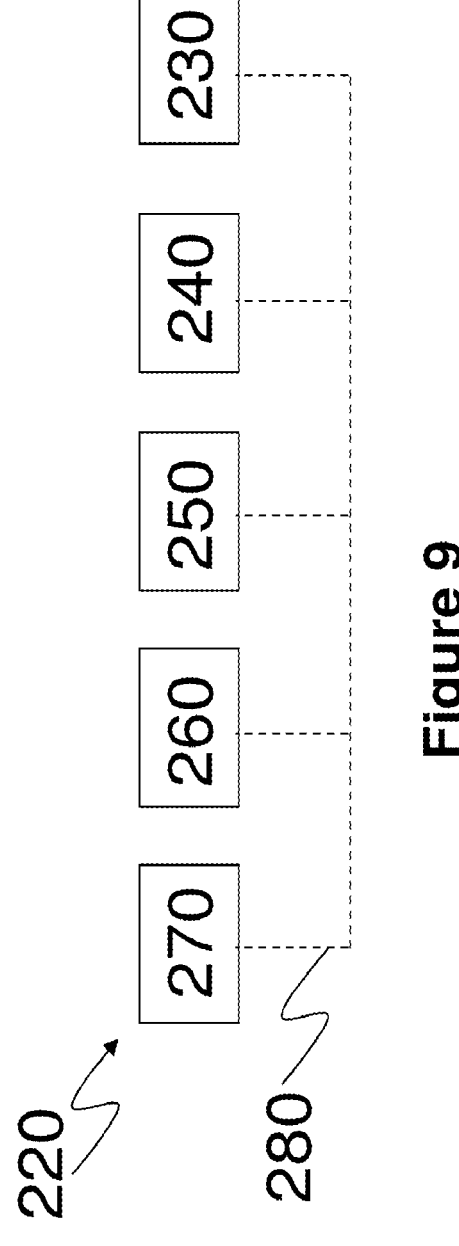
FIG. 9 shows an example architecture of schematic of a control system of the apparatus of FIGS. 1-8.

The positioner 120 may comprise any one or more of linear motors, drive belts, stepper motors, rack and pinion arrangements, for example, or generally any suitable components arranged to provide linear motion. In the present embodiment the positioner comprises a linear actuator in the form of a ball-screw linear stage driven by a stepper motor, a carriage moved by the linear actuator and a rail orientated in the z direction along which the carriage travels. The limb 123 is attached to the carriage. The positioner may have a dedicated stepper motor controller, as in the present embodiment, however in other embodiments the control system 160 may control the stepper motor. The carriage can be moved along the rail to the positioner position value The positioner 120, the light source, force sensing system 510 and possibly other parts of the apparatus 100 may be in communication with and may be controlled by the control system 160 to coordinate the apparatus 100 to make the object. These and other components may be connected by wires, cables, wireless, or any other suitable means. In this embodiment, the control system may have a processor 220 in the form of a processor unit, schematically illustrated in FIG. 9. The processor unit 220 may include a suitable logic device 250 such as, or similar to, the INTEL PENTIUM, ARM processor, or a suitably configured field programmable gate array (FPGA), connected over a bus 280 to a random access memory 240 of around 100 Mb and a non-volatile memory such as a hard disk drive 260 or solid state non-volatile memory having a capacity of around 1 Gb. The processor has input/output interfaces 270 such as a universal serial bus and a possible human machine interface 230 e.g. mouse, keyboard, display etc. Device components may be controlled using commercially available machine-to-machine interfaces such as LAB VIEW software together with associated hardware recommended by the commercial interface provider installed on the processor unit 220, over USB or RS-232 or TCP/IP links, for example. Alternatively, custom driver software may be written for improved performance together with custom printed circuit boards. Alternatively, the processor unit 220 may comprise an embedded system, or a microcontroller.

In this embodiment, the control system 160 is in communication with another processor which is adapted for determining instructions and/or information for the device. In alternative embodiments, the processors are the same processor. An example of another processing unit comprises a logic device such as, or similar to, the INTEL PENTIUM or a suitably configured field programmable gate array (FPGA), connected over a bus to a random access memory of around 4 Gb and a non-volatile memory of such as a hard disk drive or solid state non-volatile memory having a capacity of around 1 Tb. Generally, the configuration may be similar or identical to that shown in FIG. 9. The processor has a receiver such as a USB port (or Internet connection, for example) for receiving information representing a solid object, stored on a USB FLASH device, for example. The information may be encoded in a file generated by a Computer Aided Design (CAD) program, the information specifying the geometry of the object. The microprocessor runs a decomposer program implementing an algorithm that decomposes (or transforms) the information into data indicative of a plurality of sections to be formed sequentially by the device, the material being used to make the solid object. The program may have been installed onto the processor from tangible media such as a DVD or USB memory stick, for example, that stored the program. In an alternative embodiment, the decomposer may be a dedicated hardware unit. A series of sections through the object are determined, each section corresponding to a solid section to be formed. The sections may then be further processed to represent the geometry of each section as a rasterised bitmap. The sections or bitmaps may then used to control the device.

Figure 5:
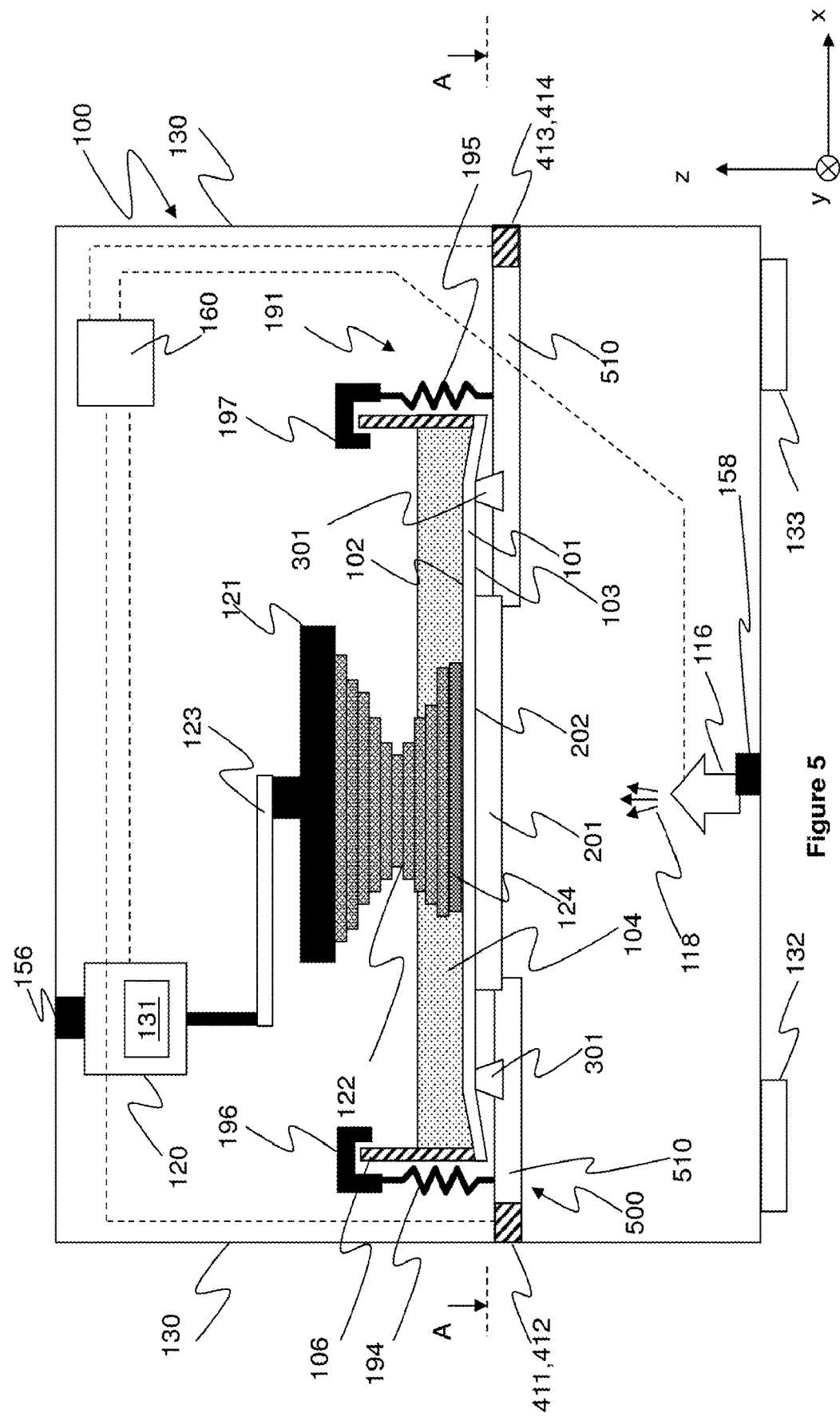
Figure 6:
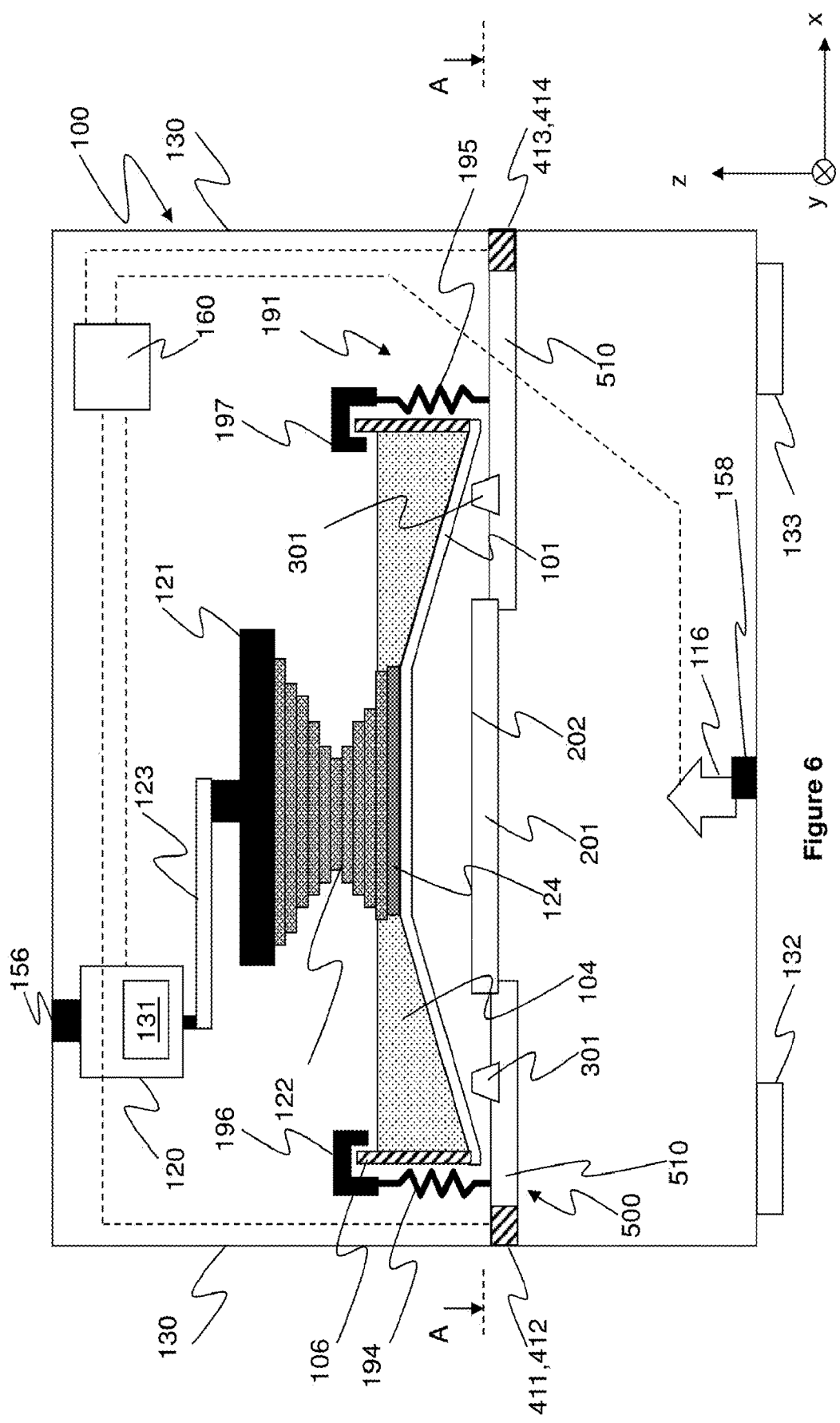
Figure 7:
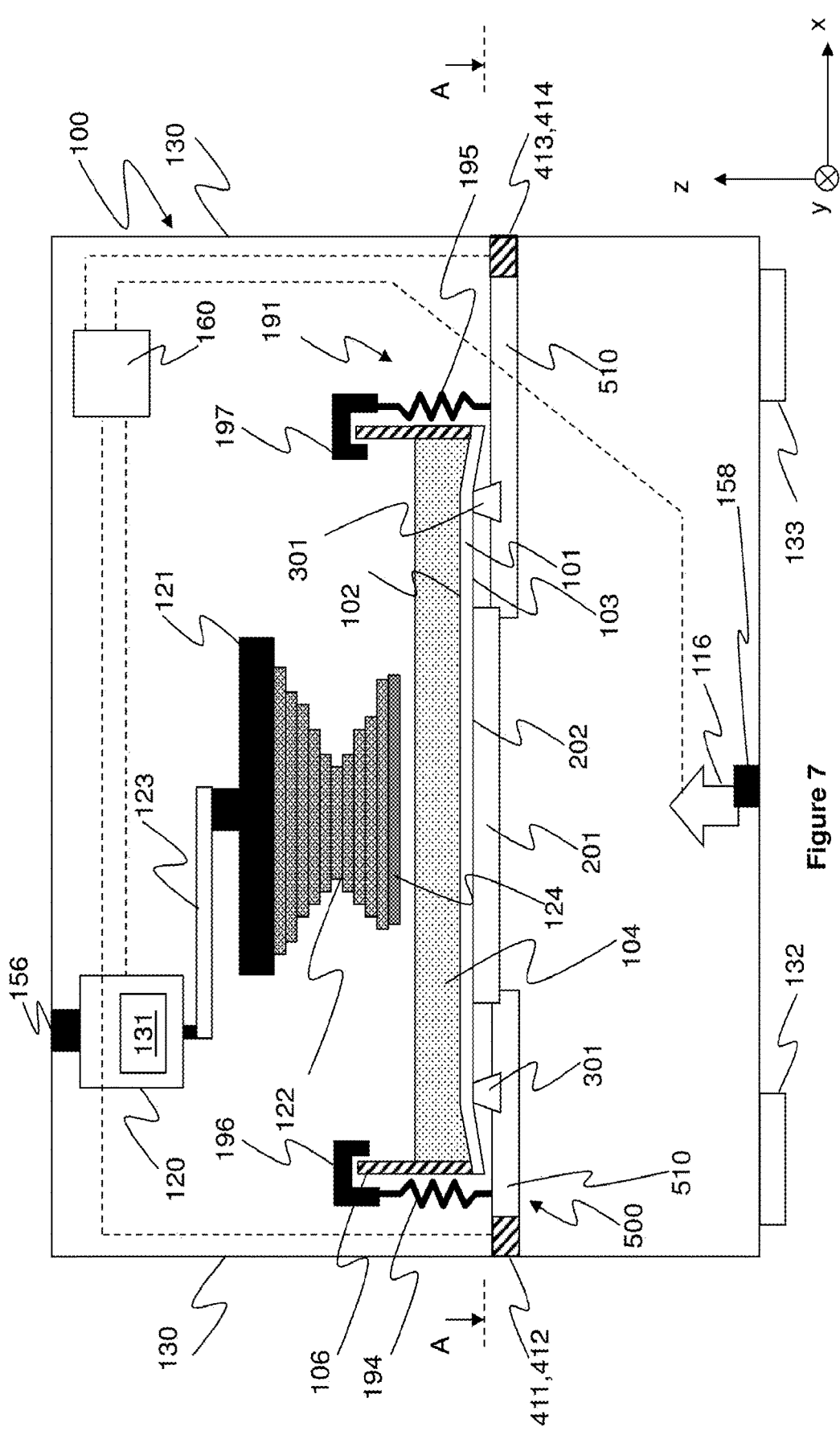

FIGS. 1 to 7 taken in sequence are indicative of an embodiment of a method for making an object. The method forms a new section of the stereolithographic object 122 and non-destructively separates it from the flexible element 101. In FIG. 1, the earlier formed plurality of section of the stereolithographic object 122 are spaced apart from the flexible element 101. In FIG. 2, positioner 120 lowers the stereolithographic object 122 being made towards the flexible element 101. As the stereolithographic object 122 approaches the sheet, the material 104 is squeezed out of the gap between the stereolithographic object 122 being made and the flexible element 101. In FIG. 3, the material displacement force is controlled and increased which may result in deflection of the apparatus. As shown in FIG. 4, the positioner 120 is reversed when the desired distance between the material receiving surface 102 and the stereolithographic object 122 being made is reached so that deflected is remove. Next, as shown in FIG. 5, material solidifying radiation 118 having spatial features in accordance with the sectional geometry of the object being made is emitted from light source 116 to selectively solidify regions of the layer of material 104 in contact with the previously formed sections 122 to form a new hardened section 124. Next, as shown in FIG. 6, positioner 120 is engaged to raise the previously formed sections 122 and newly formed section 124, causing the flexible element 101 to stretch and distort. As the flexible element 101 is pulled away from the reference surface 202, once the angle between the flexible element 101 and stereolithographic object 122 being made is sufficiently large, the flexible element 101 will peel away from the newly formed section 124 and the apparatus 100 is ready for the process to start again, as shown in FIG. 7. Repeating this sequence of actions enables a multi-laminate object to be fabricated section by section.

Figure 8:
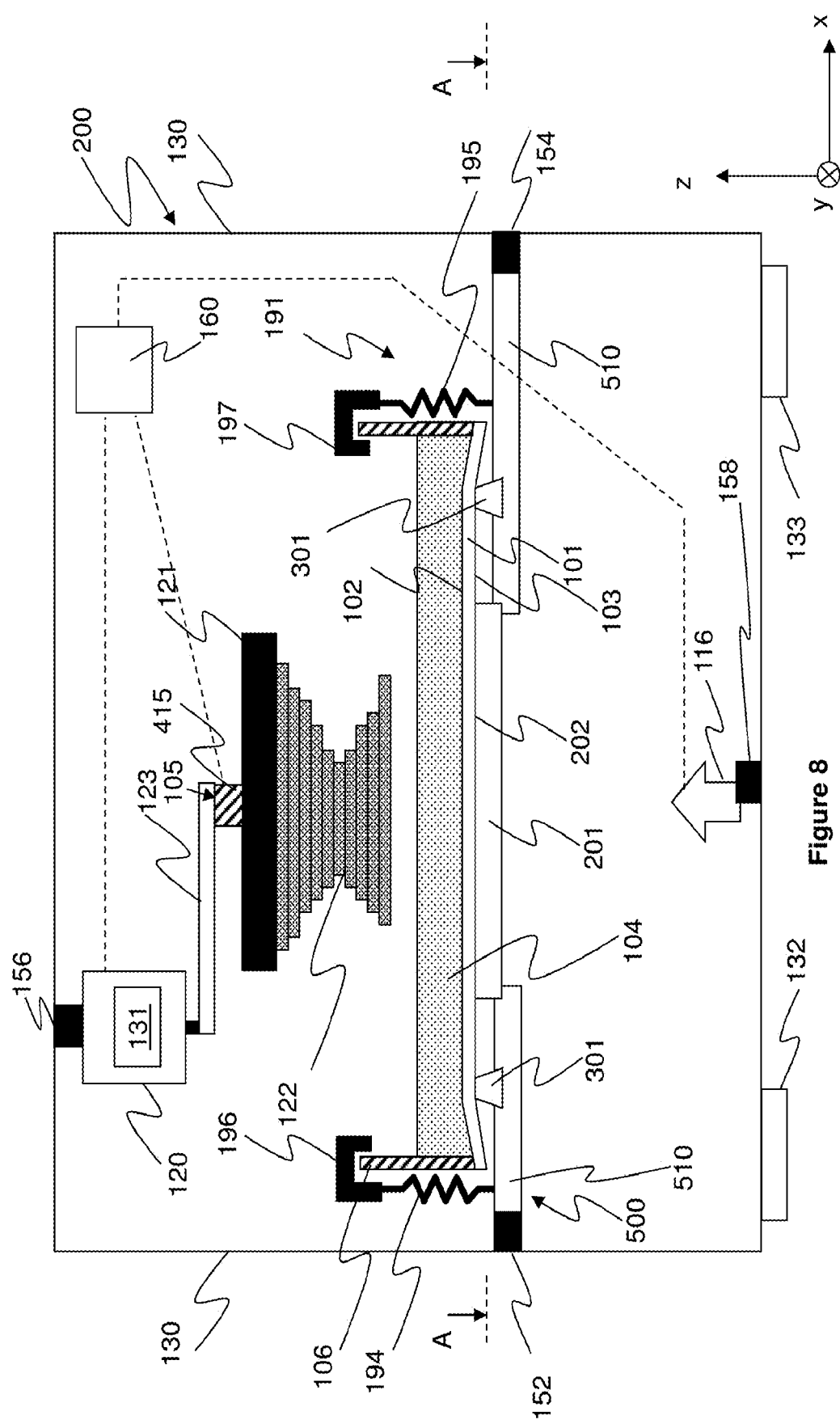
FIG. 8 shows a schematic side elevation views of another embodiment of an apparatus for making a stereolithographic object.

FIG. 8 shows another embodiment of an apparatus 200 for making a stereolithographic object, wherein parts similar and/or identical in form and/or function to the apparatus 100 are similarly numbered. Apparatus 100 has only one force sensing element 415 between the platform 121 and limb 123. The disclosure herein with reference to apparatus 100 also applies to apparatus 200, except for reference to plural force sensing elements, the location of the plural force sensing elements, and the functions that require plural force sensing elements and their location may enable. The mounting platform 510 in this embodiment is supported by mounting brackets 152, 154. In alternative embodiments, a plurality of force sensing elements may be configured between the platform 121 and limb 123.

Embodiments described herein may be used to make a stereolithographic object of generally any shape or size, including jewelry such as rings, prototype car components, micro-components for precision machines, models for investment casting, rapid prototypes, dental models, hearing aids, models of anatomical and other objects, circuit boards and architectural or design features for a building. The stereolithographic object may, for example, be rigid or resilient. It may have one or more hollows or voids, such as that of a cup or tennis ball, for example.

Now the embodiments have been described, it will be appreciated that some embodiments of the invention may have some of the following advantages:

The distance between the platform and the material receiving surface may be determined even in the presence of apparatus deformation caused by material displacement forces.

The magnitude of the material displacement force may be safely increased, which may reduce the time taken to make the stereolithographic object.

The material displacement force applied may be controlled independently of apparatus rigidity, which may enable cheaper and less rigid embodiments to operate with similar performance as more expense and rigid embodiments.

The amount of material remaining in the material vessel may be measured, permitting the control system to pause the build process when the material vessel requires replenishment.

Collisions with debris in the material liquid may be detected preventing damage from occurring to the apparatus. The location of the debris in the build envelope may be determined from the measured forces.

The use of a flexible element may reduce the risk of damage to the section and/or the stereolithographic object being made.

Variations and/or modifications may be made to the embodiments described without departing from the spirit or ambit of the invention. While in the present embodiment the material receiving surface is of a flexible element in the form of a sheet, the material receiving surface may be of an inflexible part. Apparatus 100 and 200 may alternatively utilize vessels equivalent to 108 with rigid bottoms. For example, the vessel 108 may incorporate both the side walls 106, sheet 101 and window 201. The vessel 108 may comprise a glass bottom coated with silicone or a layer of fluoropolymer such as those mentioned above to impart anti-stick properties. The flexible element 101 may not be a sheet, but rather may be wedged. The upwardly or downwardly facing surface of the flexible element 101 may be textured. The upward facing surface of the reference plate may be textured. The present embodiments are, therefore, to be considered in all respects as illustrative and not restrictive. Reference to a feature disclosed herein does not mean that all embodiments must include the feature.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. An apparatus for making a stereolithographic object, the apparatus comprising:

a platform for making the stereolithographic object thereon;

a material receiving surface for receiving a material for making the stereolithographic object;

a positioner operationally coupled to at least one of the platform and the material receiving surface and operable to change a distance between the platform and the material receiving surface; and a control system configured to receive force information indicative of a force applied to the stereolithographic object being made and to stop operation of the positioner when the force exceeds a maximum allowable force, the maximum allowable force being based on a determined plurality of cross-sectional areas of a plurality of formed sections of the stereolithographic object.

2. An apparatus for making a stereolithographic object defined by claim 1, wherein the maximum allowable force is determined by taking a weighted average of the plurality of cross-sectional areas.

3. An apparatus for making a stereolithographic object defined by claim 1, wherein the maximum allowable force is determined by applying a filter to the plurality of cross-sectional areas.

4. An apparatus defined by any one of the preceding claims wherein a number of the plurality of formed sections is dependent on a viscosity distance of the material for making the stereolithographic object.

5. An apparatus defined by claim 1, wherein the control system is configured to determine a viscosity distance of the material for making the stereolithographic object.

6. An apparatus defined by claim 2, wherein the control system is configured to determine a viscosity distance of the material for making the stereolithographic object.

7. An apparatus defined by claim 3, wherein the control system is configured to determine a viscosity distance of the material for making the stereolithographic object.

8. An apparatus defined by claim 1, wherein the control system is configured to determine a viscosity distance of the material for making the stereolithographic object, and a number of the plurality of formed sections is dependent on a viscosity distance of the material for making the stereo-lithographic object.

* * * * *